US008117250B2

(12) United States Patent  
Tan

(10) Patent No.: US 8,117,250 B2  
(45) Date of Patent: Feb. 14, 2012

(54) VDSL2 TRANSMITTER/RECEIVER ARCHITECTURE

(75) Inventor: Yaolong Tan, Suzhou (CN)

(73) Assignee: Triductor Technology (Suzhou) Inc., Jiangsu Province (CN)

( * ) Notice: Subject to any disclaimer, the term of this patent is extended or adjusted under 35 U.S.C. 154(b) by 899 days.

(21) Appl. No.: 12/159,293

(22) PCT Filed: Dec. 29, 2006

(86) PCT No.: PCT/CN2006/003700  
§ 371 (c)(1),  
(2), (4) Date: Jun. 26, 2008

(87) PCT Pub. No.: WO2007/073701  
PCT Pub. Date: Jul. 5, 2007

(65) Prior Publication Data  
US 2009/0063604 A1    Mar. 5, 2009

Related U.S. Application Data

(60) Provisional application No. 60/755,369, filed on Dec. 29, 2005, provisional application No. 60/755,364, filed on Dec. 29, 2005.

(51) Int. Cl.  
*G06F 15/10* (2006.01)
(52) U.S. Cl. ....................................................... 708/404
(58) Field of Classification Search .................. 708/404, 708/409  
See application file for complete search history.

(56) References Cited

U.S. PATENT DOCUMENTS

| 5,293,330 | A | * | 3/1994 | Sayegh ......................... 708/409 |
| 6,098,088 | A | * | 8/2000 | He et al. ........................ 708/408 |
| 7,818,360 | B2 | * | 10/2010 | Wang et al. ................... 708/404 |
| 2002/0031083 | A1 | | 3/2002 | Jin | |
| 2004/0111227 | A1 | | 6/2004 | Stein | |
| 2007/0288542 | A1 | * | 12/2007 | Shih ............................. 708/404 |

FOREIGN PATENT DOCUMENTS

| CN | 1356814 A | 7/2002 |
| CN | 1464690 A | 12/2003 |

* cited by examiner

*Primary Examiner* — Tan V Mai  
(74) *Attorney, Agent, or Firm* — Muirhead and Saturnelli, LLC

(57) ABSTRACT

The invention suggests a novel pipeline FFT/IFFT architecture that not only produces time-domain samples (after IFFT) but also pushes time-domain samples into FFT in a time-based sequential order. This reduces external memory requirement for buffering the time-domain samples. Also the design is based on a mixed radix-2 and radix-22 algorithm aiming at reducing number of multipliers and adders. Compared with other FFT/IFFT design methodologies such as radix-4, it achieves the minimum multiplier use, the minimum adder use and the minimum operating memory use. On the other hand, the design architecture not only can support different FFT/IFFT size required by different VDSL2 profiles but also utilizing a novel pipeline control mechanism to reduce logic switching at low-speed profiles. This effectively further reduces the power consumption at lower profiles and enables our VDSL2 digital chipsets to compete with ADSL2+ systems in terms of power consumption.

28 Claims, 11 Drawing Sheets

VDSL2 TRANSMITTER/RECEIVER ARCHITECTURE

CROSS-REFERENCE TO RELATED APPLICATIONS

The present application claims the benefit of provisional application No. 60/755,369 filed on Dec. 29, 2005 and provisional application No. 60/755,364 filed on Dec. 29, 2005, the contents of which are hereby incorporated by reference in their entirety.

FIELD OF THE INVENTION

The present invention relates to a novel transmitter/receiver hardware architecture, more particularly to a novel transmitter/receiver hardware architecture with a novel pipeline FFT/IFFT architecture design and the time-domain requirement reduced.

BACKGROUND OF THE INVENTION

Broadband access technology has lagged the consumer demand for many years. During $20^{th}$ century, a broadband backbone networks on primarily fiber optical has been built across the globe during the dot-com boom. However, the so-called "last mile" problem has prevented millions of homes from reaching the backbone networks and benefiting from truly broadband applications with video, voice, and data. It is certain that the future of the broadband access lies in the delivery of triple-play services of video, voice and data, which will eventually enable tremendous business and consumer opportunities such as real-time video phone, video-on-demand, video conference, virtual reality online shopping, etc.

Basically there are four competing access technologies: fiber optical, wireless, cable, DSL. EPON and GPON are two primarily fiber optical technologies. EPON stands for Ethernet Passive Optical Networks and GPON stands for Gigabit-capable Passive Optical Networks. EPON and GPON can deliver the highest data rate among all the technologies. At the same time, it has the highest initialization, operation and maintenance cost. So, the major problem with fiber optical is purely economical. Cable modem uses shared cable medium and split the total bandwidth among all connected customers. This brings the security concern and scalability problem when the number of end users starts to increase. WIMAX is a promising wireless technology for broadband access. Due to the nature of wireless, the performance may not be very reliable especially for longer distance and no line-of-sight. However, it caters nicely to the mobile applications and certainly will capture certain market share in the broadband access. DSL technology led by VDSL2, we believe, is the key enabling technology that bridging the access between the fiber optical backbone networks and the end customers. It will eventually bring economical broadband access to millions of home, which will in turn once again energize Internet through triple-play applications.

VDSL2 refers to second-generation very-high speed digital subscriber line and the first draft standard (G.993.2) was proposed in May 2005 by the International Telecommunication Union (ITU). VDSL2 is an evolving DSL technology that aiming at delivering high data rate through copper pairs. The supported data rate can be up to 100 Mbps at each direction of downstream and upstream. Different profiles are created in order to meet the requirement of different deployment scenarios mostly related to the loop distance. The following table 1 shows all the supported profiles:

TABLE 1

G.993.2 - VDSL2 profiles

| Frequency plan | Parameter | 8a | 8b | 8c | 8d | 12a | 12b | 17a | 30a |
|---|---|---|---|---|---|---|---|---|---|
| All | Maximum aggregate downstream transmit power (dBm) | +17.5 | +20.5 | +11.5 | +14.5 | +14.5 | +14.5 | +14.5 | +14.5 |
| All | Maximum aggregate upstream transmit power (dBm) | +14.5 | +14.5 | +14.5 | +14.5 | +14.5 | +14.5 | +14.5 | +14.5 |
| All | Sub-carrier spacing(s) (kHz) | 4.3125 | 4.3125 | 4.3125 | 4.3125 | 4.3125 | 4.3125 | 4.3125 | 8.625 |
| All | Support of upstream band zero (US0) | Required | Required | Required | Required | Required | Not Required | Not Required | Not Required |
| All | Minimum net aggregate data rate capability (Mbit/s) | 50 Mbit/s | 50 Mbit/s | 50 Mbit/s | 50 Mbit/s | 68 Mbit/s | 68 Mbit/s | 100 Mbit/s | 200 Mbit/s |
| All | Aggregate interleaver and de-interleaver delay (octets) | 65,536 | 65,536 | 65,536 | 65,536 | 65,536 | 65,536 | 98,304 | 131,072 |
| All | $D_{max}$ | 2048 | 2048 | 2048 | 2048 | 2048 | 2048 | 3072 | 4096 |
| All | $1/S_{max}$ downstream | 24 | 24 | 24 | 24 | 24 | 24 | 48 | 28 |
| All | $1/S_{max}$ upstream | 12 | 12 | 12 | 12 | 24 | 24 | 24 | 28 |

Lower profiles such as 8a~12b are used to support medium range loop length with a distance between 3 kft to 8 kft while high speed profiles 17a~30a are used to support short range loop length of less than 3 kft. Only 30 MHz profile 30a is able to support 100 Mbps on both upstream and downstream while 17 MHz profile 17a can support aggregated 100 Mbps.

Discrete-Multi-Tone is used as the basic modulation scheme for VDSL2. The total bandwidth is split into multiple smaller sub-carriers through IFFT and FFT engines. All profiles except 30 MHz has sub-carrier tone spacing of 4.3125 KHz, while 30 MHz profile has sub-carrier tone spacing of 8.625 KHz in order to support a total bandwidth up to 30 MHz with 4096 sub-carriers.

FFT and IFFT engines are two major blocks in DMT-based VDSL2 communication system. Due to the fact that the FFT and IFFT modules use significant number of multipliers and adders as well as memory, they incur significantly larger die cost than other modules in VDSL2 system. On the other hand, the FFT and IFFT modules need to run at very high rate in order to achieve the system frame rate and sampling rate requirement, they consume a large percentage of the total digital power. This is especially true for high data rate based VDSL2 profiles such as 30 MHz or 17 MHz.

In order to improve the system performance, DMT-based VDSL2 systems standardize the prefix and suffix insertion to reduce ISI and the transmitter shaping to the frame boundary. In addition, the receiver windowing is employed at the receiver side to further reduce the effect of crosstalk and narrow-band interference. However, the inclusion of the above methods requires a re-ordering of the transmitter and receiver time-domain samples, which usually requires a large time-domain buffering memory.

In term of architecture design, 30 MHz profile imposes biggest challenge because of its highest sampling rate (at least 69 MHz Nyquist rate). It requires very careful design on FFT and IFFT to meet the timing requirement based on different processing technologies. On the other hand, if multiple profiles are supported, the FFT/IFFT design architecture needs to efficiently accommodate different FFT/IFFT sizes. If all VDSL2 profiles are supported and also the design is backward capable with ADSL2+, the following FFT/IFFT sizes are needed (without over-sampling): 8192 (for 30a, 17a, 12a, 12b), 4096 (for 8a, 8b, 8c, 8d), 1024 (for ADSL2+). Our FFT/IFFT design is capable of supporting all FFT/IFFT sizes of $2^i$, i can be any positive integer while it is flexible enough to choose the supported sizes to reduce the hardware cost. In the case of VDSL2, we can configure it to support up to 8192 while limiting the choices of allowed sizes to be only $2^i$, i=6, 10, 12, 13. It is apparent that this configuration is the minimum set to support all required profiles and ADSL2+ compatibility and has the minimum hardware cost.

On the transmitter side, the IFFT engine converts frequency-domain tones to time-domain samples. Each frequency-domain tone is modulated by QAM (Quadrature Amplitude Modulation) signal. Each QAM modulation can carry up to 15 information bits, which can be un-coded or coded depending on if or not TCM (Trellis-Code-Modulation) is used. Due to the communication channel dispersion, the cyclic prefix is added at the beginning of the transmitter frame so that the previous DMT frame does not interference with the current DMT frame. Of course, the cyclic prefix will be affected by the previous DMT frame and therefore it is removed from the DMT frame on the receiver side. For longer loop, usually a Time-Domain Equalizer (TEQ) is employed to shorten the channel so that the prefix length can be reduced.

In addition, in order to maintain orthogonality between the disturbing transmit signal and the received signal, the cyclic suffix is added to the transmitter DMT frame to protect the frame from the self echo and near-end crosstalk (NEXT). The cyclic suffix is used together with a timing advance mechanism to make sure that the transmitters and receivers are sufficiently aligned in time. If the time-advance is properly set, the orthogonality can always be maintained as far as the total length of the cyclic prefix and cyclic suffix is longer than the time-dispersion and propagation delay of the communication channel.

On the receiver side, the prefix and suffix segments are stripped from the received DMT frame while the received samples protected by the prefix and suffix are sent to the FFT engine. The FFT engine then converts the time-domain samples back to the frequency-domain tones and the information bits are extracted. In order to further mitigate the effect of near-end crosstalk and narrow-band crosstalk, usually the receiver windowing is used to smooth the received protected frame on the boundary with the prefix and suffix segments.

The prefix and suffix insertion and the receiver windowing complicate the time-domain data sequence. On the transmitter side, it requires memory buffers to store the time-domain data from the IFFT. Then the prefix and suffix are inserted based on buffered time-domain data. While on the receiver side, the time-domain data has to be buffered first before a normal FFT frame is extracted from the buffered data and sent to the FFT engine.

SUMMARY OF THE INVENTION

The present invention provides an innovative hardware implementation architecture that almost completely eliminates the time-domain buffer requirement. The method of the invention introduces only very minor hardware cost on the IFFT engine for the transmitter side. No additional hardware cost on the receiver side is incurred by our scheme except some modifications on the firmware are needed to be modified.

The invention suggests a novel pipeline FFT/IFFT architecture that not only produces time-domain samples (after IFFT) but also pushes time-domain samples into FFT in a time-based sequential order. This reduces external memory requirement for buffering the time-domain samples. Also the design is based on a mixed radix-2 and radix-$2^2$ algorithm aiming at reducing number of multipliers and adders. Compared with other FFT/IFFT design methodologies such as radix-4, it achieves the minimum multiplier use, the minimum adder use and the minimum operating memory use. On the other hand, our design architecture not only can support different FFT/IFFT size required by different VDSL2 profiles but also utilizing a novel pipeline control mechanism to reduce logic switching at low-speed profiles. This effectively further reduces the power consumption at lower profiles and enables our VDSL2 digital chipsets to compete with ADSL2+ systems in terms of power consumption.

The innovative implementation architecture of the invention almost completely eliminates the time-domain buffer requirement. The proposed method only requires very minor change on the IFFT engine on the transmitter side and some firmware modifications to support the receiver side. Large memory occupies significant die area and is prone to low yield in ASIC production process. With the proposed implementation scheme to reduce memory requirement, we can significantly reduce the gate count and die size for DMT-based VDSL2 systems with no system performance loss at all.

In accordance with the invention, a VDSL2 transmitter architecture, comprising a IFFT engine for performing inverse fast Fourier transforms, the IFFT engine having: a IFFT counter; a frequency data SRAM; a bit reverse logic used to reverse the order of the IFFT counter; seven stages, each stage except for the last including type 1 butterfly circuit and type 2 butterfly circuit; the last stage only including the type 1 butterfly circuit; each stage having a stage pipeline control generating circuit, which is basically a combination logic used to subtract some fixed pipeline latency from previous stage from the IFFT counter; wherein: a top-level signal (fd_fm_start) generated based on the pipeline control counter and the configured IFFT size, and used to synchronize the next module in the VDSL2 transmitter; for the first six stages, the complex data passes through type 1 and type 2 butterfly circuits; the output complex vector of butterfly type 2 is multiplied with the twiddle factor ROM output and the address of the twiddle factor ROM is generated through the pipeline control generating circuit for that stage; the IFFT output being taken from the output of butterfly type 2 of the stage 3, stage 5, stage 6, and stage 7 respectively.

In accordance with the invention, a VDSL2 receiver architecture comprising a FFT engine for performing fast Fourier transforms, the FFT engine having a FFT counter; seven stages, each stage except for the first including type 1 butterfly circuit and type 2 butterfly circuit; the first stage only including the type 1 butterfly circuit; each stage having a stage pipeline control generating circuit, which is basically a combination logic used to subtract some fixed pipeline latency from previous stage from the FFT counter; wherein: a top-level signal (fd_fm_start) generated based on the pipeline control counter and the configured FFT size, and used to synchronize the next module in the VDSL2 receiver; for the last six stages, the complex data passes through type 1 and type 2 butterfly circuits; the output complex vector of butterfly type 2 is multiplied with the twiddle factor ROM output and the address of the twiddle factor ROM is generated through the pipeline control generating circuit for that stage; the FFT output being taken from the output of the stage 1, stage 2, stage 4, and stage 7 respectively.

Our focus is VDSL2 application. However, the same technology is applicable to other applications such as WiMAX etc.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE INVENTION

Mixed Radix-2 and Radix-$2^2$ Based IFFT Design

First, we derive the basic mathematics formula for mixed radix-2 and radix-$2^2$ based IFFT with a decimation-in-frequency ordering. The reason we apply the decimation-in-frequency ordering algorithm is due to the fact that we want the sampling data produced by IFFT to be in natural order so that we would be able to reduce memory requirement for time-domain buffering. Section 4 will give further explanation regarding the time-domain buffer reduction.

Figure 1:
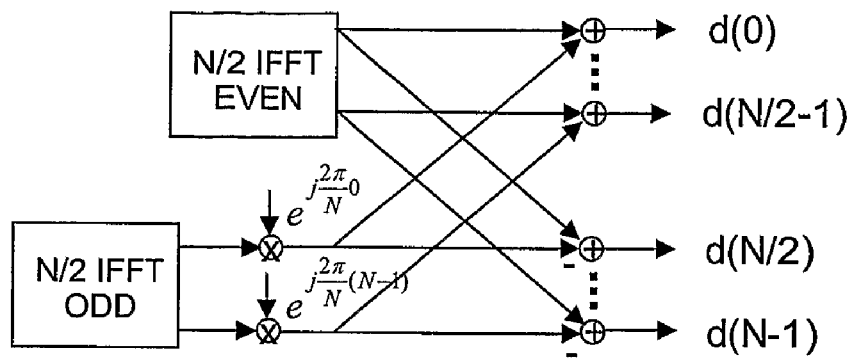
FIG. 1 shows the basic IFFT Radix-2 Bufferfly.

Assume the IFFT size is N, the direct IFFT computation can be written as $$d(n) = \sum_{k=0}^{N-1} f(k) e^{j\frac{2\pi}{N}kn},$$

where $d(n), n=0, 1, \ldots, N-1$ is time-domain output, $f(k), k=0, 1, \ldots, N-1$ is the frequency domain input, and $$e^{j\frac{2\pi}{N}kn}$$

is the so-called twiddle factor, $f(k)$. The first step is to split the above computation with radix-2 in frequency as follows:

$$d(n) = \sum_{k=0}^{\frac{N}{2}-1} f(2k) e^{j\frac{2\pi}{N}2kn} + \sum_{k=0}^{\frac{N}{2}-1} f(2k+1) e^{j\frac{2\pi}{N}(2k+1)n}$$

$$= \sum_{k=0}^{\frac{N}{2}-1} f(2k) e^{j\frac{2\pi}{(N/2)}kn} + e^{j\frac{2\pi}{N}n} \sum_{k=0}^{\frac{N}{2}-1} f(2k+1) e^{j\frac{2\pi}{(N/2)}kn}$$

$$= \sum_{k=0}^{N_1-1} f_{even}(k) e^{j\frac{2\pi}{N_1}kn} + e^{j\frac{2\pi}{N}n} \sum_{k=0}^{N_1-1} f_{odd}(k) e^{j\frac{2\pi}{N_1}kn}$$

$$= d_{N_1}(n) + e^{j\frac{2\pi}{N}n} d_{N_1+1}(n)$$

where we redefine $N_1 = N/2$, $f_{even}(k) = f(2k)$, and $f_{odd}(k) = f(2k+1)$. We can see that we have already split the computation of $d(n)$ into two independent computations with separate frequency inputs. FIG. 1 shows the basic operation of the first radix-2 based step.

Next step is to use our radix-$2^2$ algorithm to continue the splitting process into four independent computations recursively. First we deal with the first computation and substitute $k=4k_2+k_1$, $k_1=0, 1, 2, 3$, into $f_{even}(k)$ so that we can have four independent frequency component:

$$d_{N_1}(n) = \sum_{k_2}^{\frac{N_1}{4}-1} f_{even}(4k_2) e^{j\frac{2\pi}{N_1}4k_2 n} + \sum_{k_2}^{\frac{N_1}{4}-1} f_{even}(4k_2+1) e^{j\frac{2\pi}{N_1}(4k_2+1)n} +$$

$$\sum_{k_2}^{\frac{N_1}{4}-1} f_{even}(4k_2+2)e^{j\frac{2\pi}{N_1}(4k_2+2)n} + \sum_{k_2}^{\frac{N_1}{4}-1} f_{even}(4k_2+3)e^{j\frac{2\pi}{N_1}(4k_2+3)n}$$

$$= \sum_{k_2}^{\frac{N_1}{4}-1} f_{even}(4k_2)e^{j\frac{2\pi}{N_1/4}k_2 n} + e^{j\frac{2\pi}{N_1}2n}\sum_{k_2}^{\frac{N_1}{4}-1} f_{even}(4k_2+2)e^{j\frac{2\pi}{N_1/4}k_2 n} +$$

$$e^{j\frac{2\pi}{N_1}n}\sum_{k_2}^{\frac{N_1}{4}-1} f_{even}(4k_2+1)e^{j\frac{2\pi}{N_1/4}k_2 n} + e^{j\frac{2\pi}{N_1}3n}\sum_{k_2}^{\frac{N_1}{4}-1} f_{even}$$

$$(4k_2+3)e^{j\frac{2\pi}{N_1/4}k_2 n}$$

If we stop at this step, this will be a standard radix-4 based algorithm. In order to further reduce the number of adders we use in the IFFT engine, we continue with the following splitting process. We substitute $$n = \frac{N_1}{2}n_1 + \frac{N_1}{4}n_2 + n_3,$$

where $n_1=0, 1$, $n_2=0, 1$, and $$n_3 = 0, 1, \ldots, \frac{N_1}{4}-1$$

into the above equation and obtain $$d_{N_1}(n) = \sum_{k_2}^{\frac{N_1}{4}-1} f_{even}(4k_2)e^{j\frac{2\pi}{N_1/4}k_2\left(\frac{N_1}{2}n_1+\frac{N_1}{4}n_2+n_3\right)} +$$

$$e^{j\frac{2\pi}{N_1}2\left(\frac{N_1}{2}n_1+\frac{N_1}{4}n_2+n_3\right)}\sum_{k_2}^{\frac{N_1}{4}-1} f_{even}(4k_2+2)e^{j\frac{2\pi}{N_1/4}k_2\left(\frac{N_1}{2}n_1+\frac{N_1}{4}n_2+n_3\right)} +$$

$$e^{j\frac{2\pi}{N_1}\left(\frac{N_1}{2}n_1+\frac{N_1}{4}n_2+n_3\right)}\sum_{k_2}^{\frac{N_1}{4}-1} f_{even}(4k_2+1)e^{j\frac{2\pi}{N_1/4}k_2\left(\frac{N_1}{2}n_1+\frac{N_1}{4}n_2+n_3\right)} +$$

$$e^{j\frac{2\pi}{N_1}3\left(\frac{N_1}{2}n_1+\frac{N_1}{4}n_2+n_3\right)}\sum_{k_2}^{\frac{N_1}{4}-1} f_{even}(4k_2+3)e^{j\frac{2\pi}{N_1/4}k_2\left(\frac{N_1}{2}n_1+\frac{N_1}{4}n_2+n_3\right)} =$$

$$\sum_{k_2}^{\frac{N_1}{4}-1} f_{even}(4k_2)e^{j\frac{2\pi}{N_1/4}k_2 n_3} +$$

$$(-1)^{n_2} e^{j\frac{2\pi}{N_1}2n_3}\sum_{k_2}^{\frac{N_1}{4}-1} f_{even}(4k_2+2)e^{j\frac{2\pi}{N_1/4}k_2 n_3} +$$

$$e^{j\frac{2\pi}{N_1}\left(\frac{N_1}{2}n_1+\frac{N_1}{4}n_2\right)}\left\{e^{j\frac{2\pi}{N_1}n_3}\sum_{k_2}^{\frac{N_1}{4}-1} f_{even}(4k_2+1)e^{j\frac{2\pi}{N_1/4}k_2 n_3} + \right.$$

$$\left. (-1)^{n_2} e^{j\frac{2\pi}{N_1}3n_3}\sum_{k_2}^{\frac{N_1}{4}-1} f_{even}(4k_2+3)e^{j\frac{2\pi}{N_1/4}k_2 n_3}\right\} =$$

$$\sum_{k_2}^{\frac{N_1}{4}-1} f_{even}(4k_2)e^{j\frac{2\pi}{N_1/4}k_2 n_3} + (-1)^{n_2} e^{j\frac{2\pi}{N_1}2n_3}$$

$$\sum_{k_2}^{\frac{N_1}{4}-1} f_{even}(4k_2+2)e^{j\frac{2\pi}{N_1/4}k_2 n_3} +$$

$$(j)^{2n_1+n_2}\left\{e^{j\frac{2\pi}{N_1}n_3}\sum_{k_2}^{\frac{N_1}{4}-1} f_{even}(4k_2+1)e^{j\frac{2\pi}{N_1/4}k_2 n_3} + \right.$$

$$\left. (-1)^{n_2} e^{j\frac{2\pi}{N_1}3n_3}\sum_{k_2}^{\frac{N_1}{4}-1} f_{even}(4k_2+3)e^{j\frac{2\pi}{N_1/4}k_2 n_3}\right\}$$

So far, we can see that we have already split the original computation with IFFT size of $N_1$ into four sets of smaller IFFT size of $N_1/4$. Furthermore, we can see that there are two butterfly structures exhibited in the above equation. The first type, called BF Type 1, has the following structure: $W_0 \times IFFT_{N/4,0} + (-1)^{N_1}W_1 \times IFFT_{N/4,1}$, where $$W_0 = 1 \text{ or } e^{j\frac{2\pi}{N_1}n_3}, W_0 = e^{j\frac{2\pi}{N_1}n_3} \text{ or } e^{j\frac{2\pi}{N_1}3n_3}$$

are the corresponding twiddle factors. The outer butterfly, called BF Type 2, has the following structure: $BFI_{N/4,0} + (j)^{2n_1+n_2} BFI_{N/4,1}$, where $j^{2n_1+n_2}$ only involves switch between the real and imaginary components not multiplications. Similarly $d_{N_1+1}$ can also be split to four sets of smaller IFFT size of $N_1/4$ with BF Type 1 and BF Type 2.

Figure 2:
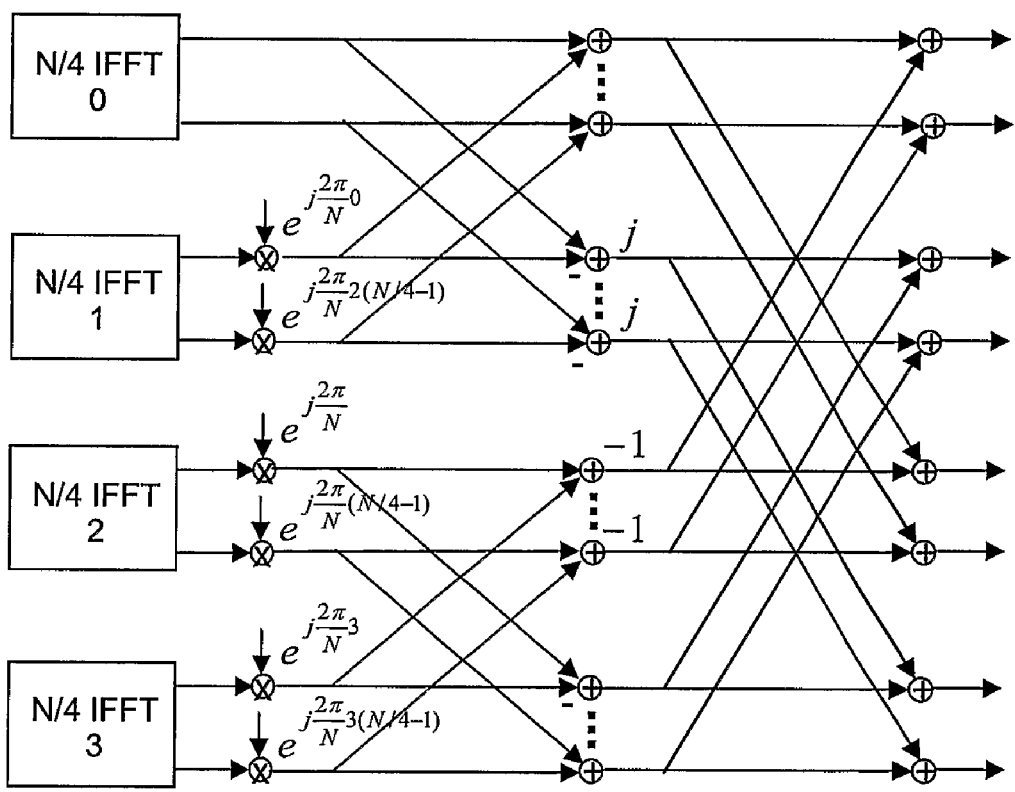
FIG. 2 shows IFFT Radix-$2^2$ basic operation.
Figure 3:
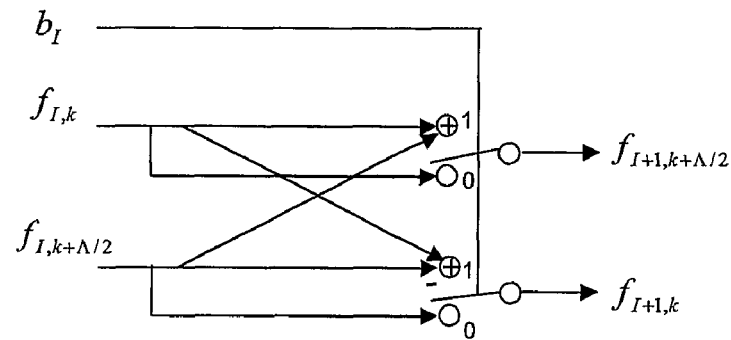
FIG. 3 shows IFFT Butterfly Type 1.
Figure 4:
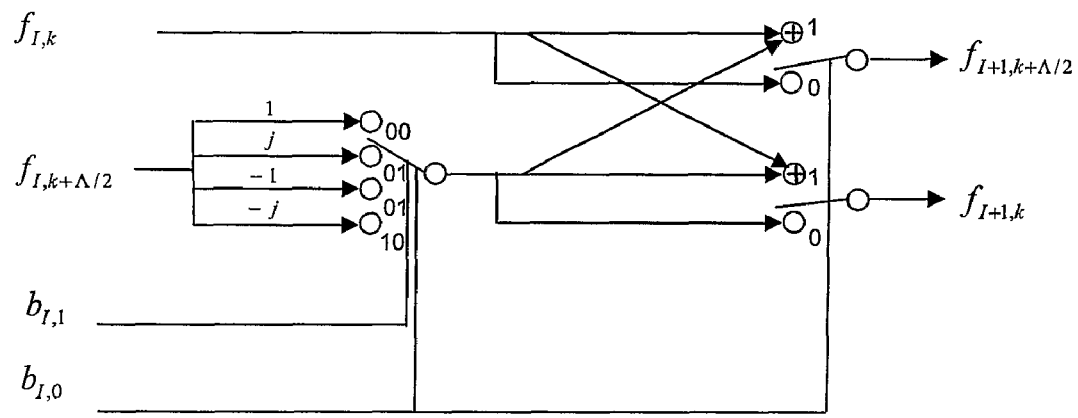
FIG. 4 shows IFFT Butterfly Type 2.

The above divide-and-conquer process can be continued until the final IFFT size is less than 4 which eventually will reach the frequency domain input in a bit-reversed order. FIG. 2 shows the basic operation for radix-$2^2$ based algorithm. So far, we have the mathematical derivation of the mixed radix-2 and radix $2^2$ based IFFT algorithm. In term of hardware implementation architecture, we will follow the Single-path Delay Feedback (SDF) pipeline approach. As we discussed, two types of butterfly structures are used: BF Type 1 and BF Type 2, which are shown in FIGS. 3 and 4.

We can see that Butterfly Type 1 needs two complex adders or four real adders while Butterfly Type 2 requires also two complex adders or four real adders, and some simple logic for real and imaginary switching based on the control vector $[b_{1,1}b_{1,0}]$ from the pipeline controller. Therefore, we need total of 4 complex adders or 8 real adders for each Radix-$2^2$ stage of the IFFT. For our IFFT design that can support up to 8192 IFFT, we need a total of 26 complex adders or 52 real adders.

With the above Type 1 and Type 2 butterfly structures, we can further build the hardware architecture for 8192 IFFT. We will discuss the overall IFFT architecture in Section 5. Another novel feature we added to our IFFT design is the sample-reordering process, which is used together with the transmit prefix and suffix insertion circuit to reduce the time-domain sample buffer requirement. This is discussed in detail in another our patent proposal titled "Method and Apparatus to Reduce Time-Domain Memory Requirement for DMT-Based Systems".

Method and Apparatus to Reduce Transmitter Memory Buffer Requirement with IFFT Output Sample-Reordering Design The Mixed Radix-2 and Radix-2 IFFT design discussed in last section is based on the assumption that the data output sequence will be a natural order of $d_0, d_1, \ldots, d_N$. However, with the prefix and suffix insertion requirement, this natural order is not the best choice. Based on the prefix and suffix definition in G.993.2, the prefix comes from the end of the DMT. However, the prefix needs to be sent out first. This means that we need to buffer all the data samples until the last part of DMT frame has shown from the IFFT engine. This requires significant memory. So, in this section, we introduce our sample-reordering structure to shift the time-domain sequence.

Figure 7:
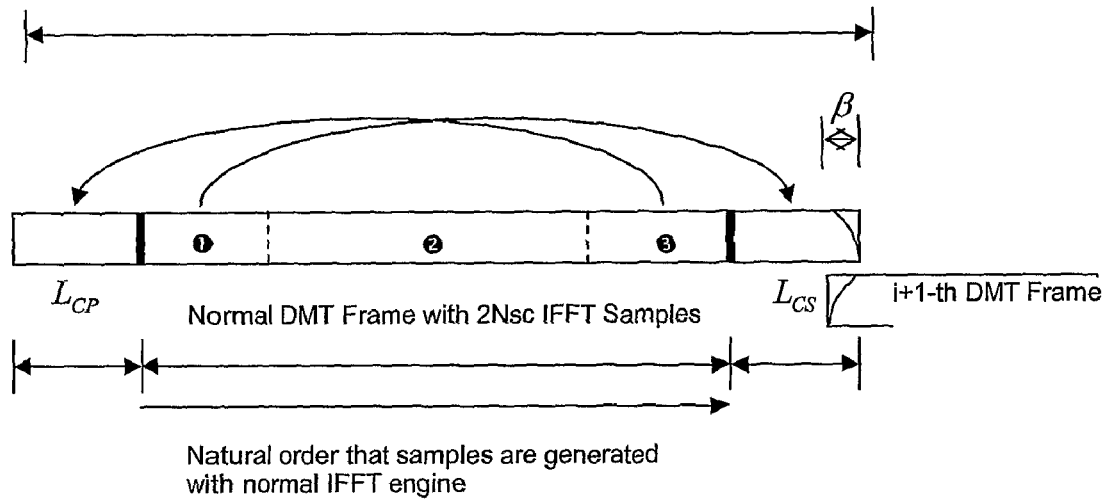
FIG. 7 shows a general split of cyclic extension between $L_{CP}$ cyclic prefix and $L_{CS}$ cyclic suffix.

In order to understand our proposed method, we first take a look at the prefix and suffix insertion scheme standardized in DMT-based VDSL2 systems. FIG. 7 shows a general split of cyclic extension between $L_{CP}$ cyclic prefix and $L_{CS}$ cyclic suffix. The middle part is the normal DMT Frame that contains $2N_{SC}$ IFFT time-domain samples and $N_{SC}$ is the number of sub-carriers used in the IFFT. Assume that $2N_{SC}$ IFFT samples are generated from the IFFT engine in natural order with decimation-in-frequency based IFFT engine, as shown in the figure by the symbols ❶ ❷ and ❸. Since $L_{CP}$ cyclic prefix comes from the end of the $2N_{sc}$ IFFT samples and needs to be sent out before the first IFFT sample in the normal IFFT frame, the transmitter has to store all the IFFT samples until the $L_{CP}$ cyclic prefix portion shows up from the IFFT engine. In fact, the transmitter has to continue storing the $L_{CP}$ cyclic prefix since it will be transmitted again as the last part of the IFFT frame samples. We can see that if cyclic prefix is used, a memory size of up to $2N_{SC} \times M$ (M is the bit precision for the time-domain samples) may be needed at the IFFT output to store the transmit samples for further framing. On the other hand, if the cyclic prefix length is zero and only the cyclic suffix is used, then only first $L_{CP}$ time-domain samples are needed to be stored and sent again as cyclic suffix after the major IFFT samples. The following table lists the memory requirements for three different split cases:

| Cyclic Split | Memory Requirement |
| --- | --- |
| No prefix, $L_{CP} = 0$ and $L_{CS} = L_{CE} + \beta$ | $L_{CS} \times M$ |
| 50%-50% split between prefix and suffix | $2N_{SC} \times M$ |
| No suffix, $L_{CP} = L_{CE} + \beta$ and $L_{CS} = 0$ | $(2N_{SC} - L_{CP}) \times M$ | where $\beta$ is overlap window length. The overlap window basically is a weighted average between two transmitter frames.

In VDSL2(G.993.1), for $N_{SC}=4096$, the cyclic extension $L_{CS}=640$ while the maximum value of $\beta$ is $16 \times 2^n$, but not more than 255. This means that it requires storing at most 895 time-domain samples for no prefix split, 8096 time-domain samples for 50%-50% split, and at least 7297 time-domain samples for no suffix split. So, we can see that the minimum memory requirement is achieved if the cyclic extension only contains suffix not prefix. However, VDSL2 standard requires that the length of prefix $L_{CP}$ and the length of suffix $L_{CS}$ shall be larger than the overlap factor $\beta$. This means that the full size memory buffer $2N_{SC} \times M$ is needed if the normal IFFT engine is used.

On the other hand, two $2N_{SC} \times M$ memories may be needed for some implementation if both the IFFT engine and prefix and suffix insertion engine need to access the data. In this case, a kind of ping-pong buffer scheme has to be applied that uses $4N_{SC} \times M$ SRAM. For $N_{SC}=4096$(30, 17 and 12 MHz profiles) and M=16, the potential time-domain memory size is about 32 Kbytes.

Figure 8:
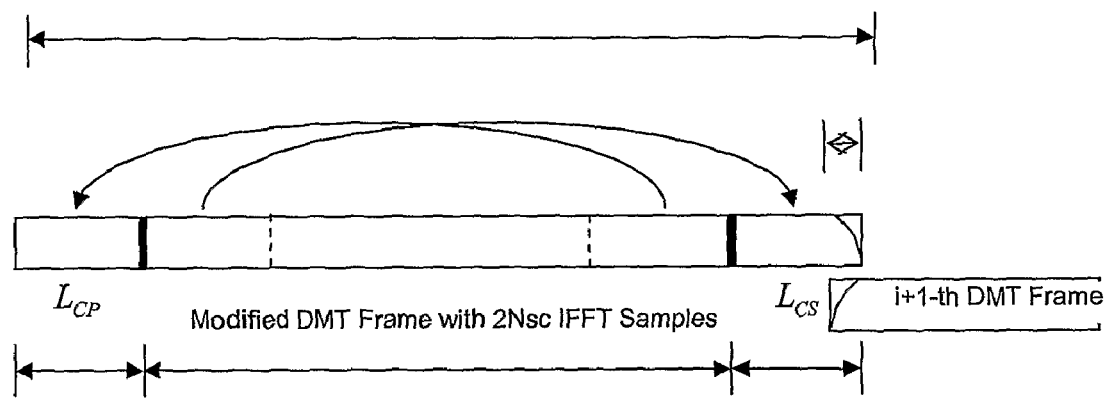
FIG. 8 shows a new time-domain sequence generated by the modified IFFT engine.

Here we propose to modify the normal IFFT engine to fit a novel prefix and suffix insertion architecture so that we can almost completely eliminate time-domain buffer requirement. The basic idea is to retrofit the normal IFFT engine and incorporate a sample-reordering mechanism so that the modified IFFT engine can generate as the new sequence shown in FIG. 8. The time-domain DTM frame samples are generated in the order that is indicated by ❶ ❷ and ❸.

Different from the normal approach, our modified IFFT engine generates the prefix part first as shown by ❶. The prefix part will be transmitted immediately and buffered at the same time. Then the suffix part will be generated as shown by ❷, which is also immediately transmitted and buffered. Then the sample portion labeled by ❸ is generated by the IFFT engine and transmitted immediately. Different from the prefix and suffix parts, the sample portion labeled by ❸ will not be buffered at all since it is not needed at later stage. So far, the modified IFFT engine has produced all the time-domain frame samples. The prefix and suffix insertion engine will then take the buffered prefix and suffix samples and re-transmit them again. We can see that with the modified sequence we only need to buffer the prefix and suffix portions and do not need to buffer the normal frame labeled by ❸, which significantly reduces the memory requirement. As defined in VDSL2 standard, for $N_{SC}=4096$, the cyclic extension (the summation of cyclic prefix and suffix) $L_{CE}=640$. This means that we only need much smaller buffer of $L_{CE} \times M$. In addition, our method seamlessly integrates the IFFT engine with the prefix and suffix insertion module so that there is no memory access conflict between them. Therefore, we definitely do not need ping-pong type of double buffers. Compared with normal implementation that requires up to 32 Kbytes of time-domain memory buffer, our proposed scheme only requires $L_{CE} \times M=1.28$ Kbytes of memory.

Here we proposed two methods to shift the time-domain sequence. First we assume that we want to shift the sample sequence by M, which means we will have the following time-domain sequence: d(M), d(M+1), ..., d(N), d(0), d(M−1). The corresponding IFFT is shown as in the following:

$$d(n+M) = \sum_{k=0}^{N-1} f(k) e^{j\frac{2\pi}{N}k(n+M)}, n = 0, 1, \ldots, N-1.$$

Now we reorganize it as the following:

$$d(n+M) = \sum_{k=0}^{N-1} \left[ f(k) e^{j\frac{2\pi}{N}kM} \right] e^{j\frac{2\pi}{N}kn}, n = 0, 1, \ldots, N-1.$$

Where means that in order to shift the time-domain sample sequence by M, we need to multiply all the frequency sub-carriers f (k), k=0, 1, . . . , N−1 by a factor of $$e^{j\frac{2\pi}{N}Mk}, k = 0, 1, \ldots, N - 1.$$

This can be easily by adding a complex multiplier with corresponding twiddle factor coefficient ROM table whose address is generate by $$\frac{Mk}{N}, k = 0, 1, \ldots, N - 1.$$

Notice that the division of N can be easily implemented by taking lower $\log_2(N)$ bit after the multiplication of Mk. This is our first method. This method only requires additional complex multiplication with twiddle factor ROM with configurable address related to different sample shift amount M. It is done before sending the frequency-domain data to the normal IFFT pipeline, therefore, the control logic is very simple and the pipeline for the normal IFFT does not need to be reconfigured at all.

Assume the frequency domain tones are represented by complex values f(i), i=0, 1, . . . , $N_{SC}$−1 which correspond to a time-domain sequence of x(n), n=0, 1, . . . , $2N_{SC}$−1. The proposed time-domain sample shift can be achieved by multiplying f(i) with a phase shift factor as the following:

$$f'(i) = f(i)e^{j\frac{\pi}{N_{SC}}(2N_{SC}-L_{CP})\times i}, i = 0, 1, \ldots, N_{SC} - 1,$$

which corresponds to a re-ordered time-domain sequence of {x(n), n=$2N_{SC}-L_{CP}$, . . . , $2N_{SC}$−1, x(n), n=0, . . . , $2N_{SC}-L_{CP}$−1}. The approach requires additional hardware to carry out the multiplication of the phase shift factor e $$j\frac{\pi}{N_{SC}}(2N_{SC} - L_{CP})\times i,$$

which includes a complex multipliers and a twiddle factor ROM.

Another method is to directly propagate the sequence change through the butterfly divide-and-conquer method. This will involve the twiddle factor ROM address changes throughout the normal IFFT pipeline. First, let us derive the mathematical equations. We still start with the Radix-2 split:

$$d(n+M) = \sum_{k=0}^{\frac{N}{2}-1} f(2k)e^{j\frac{2\pi}{N}2k(n+M)} + \sum_{k=0}^{\frac{N}{2}-1} f(2k+1)e^{j\frac{2\pi}{N}(2k+1)(n+M)}$$

$$= \sum_{k=0}^{\frac{N}{2}-1} f(2k)e^{j\frac{2\pi}{(N/2)}k(n+M)} + e^{j\frac{2\pi}{N}(n+M)}\sum_{k=0}^{\frac{N}{2}-1} f(2k+1)e^{j\frac{2\pi}{(N/2)}k(n+M)}$$

$$= \sum_{k=0}^{N_1-1} f_{even}(k)e^{j\frac{2\pi}{N_1}k(n+M)} + e^{j\frac{2\pi}{N}(n+M)}\sum_{k=0}^{N_1-1} f_{odd}(k)e^{j\frac{2\pi}{N_1}k(n+M)}$$

$$= d_{N_1}(n+M) + e^{j\frac{2\pi}{N}(n+M)}d_{N_1+1}(n+M)$$

We can see that the only difference in the first step is that the twiddle factor $$e^{j\frac{2\pi}{N}n}$$

is changed to $$e^{j\frac{2\pi}{N}(n+M)}.$$

Similarly we deal with the first computation and substitute k=$4k_2+k_1$, $k_1$=0, 1, 2, 3, into $f_{even}$(k) so that we can have four independent frequency component:

$$d_{N_1}(n+M) = \sum_{k_2}^{\frac{N_1}{4}-1} f_{even}(4k_2)e^{j\frac{2\pi}{N_1}4k_2(n+m)} +$$

$$\sum_{k_2}^{\frac{N_1}{4}-1} f_{even}(4k_2+1)e^{j\frac{2\pi}{N_1}(4k_2+1)(n+M)} +$$

$$\sum_{k_2}^{\frac{N_1}{4}-1} f_{even}(4k_2+2)e^{j\frac{2\pi}{N_1}(4k_2+2)(n+M)} +$$

$$\sum_{k_2}^{\frac{N_1}{4}-1} f_{even}(4k_2+3)e^{j\frac{2\pi}{N_1}(4k_2+3)(n+M)}$$

$$= \sum_{k_2}^{\frac{N_1}{4}-1} f_{even}(4k_2)e^{j\frac{2\pi}{N_1/4}k_2(n+M)} +$$

$$e^{j\frac{2\pi}{N_1}2(n+M)}\sum_{k_2}^{\frac{N_1}{4}-1} f_{even}(4k_2+2)e^{j\frac{2\pi}{N_1/4}k_2(n+M)} +$$

$$e^{j\frac{2\pi}{N_1}(n+M)}\sum_{k_2}^{\frac{N_1}{4}-1} f_{even}(4k_2+1)e^{j\frac{2\pi}{N_1/4}k_2(n+M)} +$$

$$e^{j\frac{2\pi}{N_1}3(n+M)}\sum_{k_2}^{\frac{N_1}{4}-1} f_{even}(4k_2+3)e^{j\frac{2\pi}{N_1/4}k_2(n+M)}$$

Furthermore, we decompose $$n = \frac{N_1}{2}n_1 + \frac{N_1}{4}n_2 + n_3,$$

where $n_1$=0, 1, $n_2$=0, 1, and $$n_3 = 0, 1, \ldots, \frac{N_1}{4} - 1$$

into the above equation and obtain $$d_{N_1}(n+M) = \sum_{k_2}^{\frac{N_1}{4}-1} f_{even}(4k_2)e^{j\frac{2\pi}{N_1/4}k_2(n_3+M)} + (-1)^{n_2} e^{j\frac{2\pi}{N_1}2(n_3+M)} \sum_{k_2}^{\frac{N_1}{4}-1} f_{even}(4k_2+2)e^{j\frac{2\pi}{N_1/4}k_2(n_3+M)} +$$

$$e^{j\frac{2\pi}{N_1}(\frac{N_1}{2}n_1+\frac{N_1}{4}n_2)} \left\{ e^{j\frac{2\pi}{N_1}(n_3+M)} \sum_{k_2}^{\frac{N_1}{4}-1} f_{even}(4k_2+1)e^{j\frac{2\pi}{N_1/4}k_2(n_3+M)} + (-1)^{n_2} e^{j\frac{2\pi}{N_1}2(n_3+M)} \sum_{k_2}^{\frac{N_1}{4}-1} f_{even}(4k_2+3)e^{j\frac{2\pi}{N_1/4}k_2(n_3+M)} \right\} =$$

$$\sum_{k_2}^{\frac{N_1}{4}-1} f_{even}(4k_2)e^{j\frac{2\pi}{N_1/4}k_2(n_3+M)} + (-1)^{n_2} e^{j\frac{2\pi}{N_1}2(n_3+M)} \sum_{k_2}^{\frac{N_1}{4}-1} f_{even}(4k_2+2)e^{j\frac{2\pi}{N_1/4}k_2(n_3+M)} +$$

$$(j)^{2n_1+n_2} \left\{ e^{j\frac{2\pi}{N_1}(n_3+M)} \sum_{k_2}^{\frac{N_1}{4}-1} f_{even}(4k_2+1)e^{j\frac{2\pi}{N_1/4}k_2(n_3+M)} + (-1)^{n_2} e^{j\frac{2\pi}{N_1}3(n_3+M)} \sum_{k_2}^{\frac{N_1}{4}-1} f_{even}(4k_2+3)e^{j\frac{2\pi}{N_1/4}k_2(n_3+M)} \right\}$$

Compared with the normal IFFT equations, we can see that the only difference is that twiddle factors are modified across the pipeline. This actually involves a reconfiguration of twiddle factor ROM table address.

This method will affect how to generate the twiddle factor ROM table address for each twiddle factor multiplication stage. It basically adds additional circuit to subtract the shift amount $2N_{SC}-L_{CP}$ from the each twiddle factor address. This method replaces the complex multiplier and phase-shift twiddle factor ROM with a few subtracts.

There are pros and cons for the above two methods. The first method is very easy in the sense that it does not change the pipeline at all. Only at the beginning of new frame we need to update the new value of M. However, it adds hardware cost due to the additional complex multiplier and twiddle factor ROM table. The second method only adds little hardware cost such as one adder for each twiddle factor ROM address. However, the twiddle factor ROM pointers at different stages needs to be adjusted properly within the pipeline process to make sure that there is no glitch between different M value switching. This will somehow complicate the pipeline process.

However, the proposed method of using the IFFT sample reordering mechanism to reduce the time-domain buffer requirement does not depend on one particular IFFT method. It can be applied to any IFFT methods.

Figure 9:
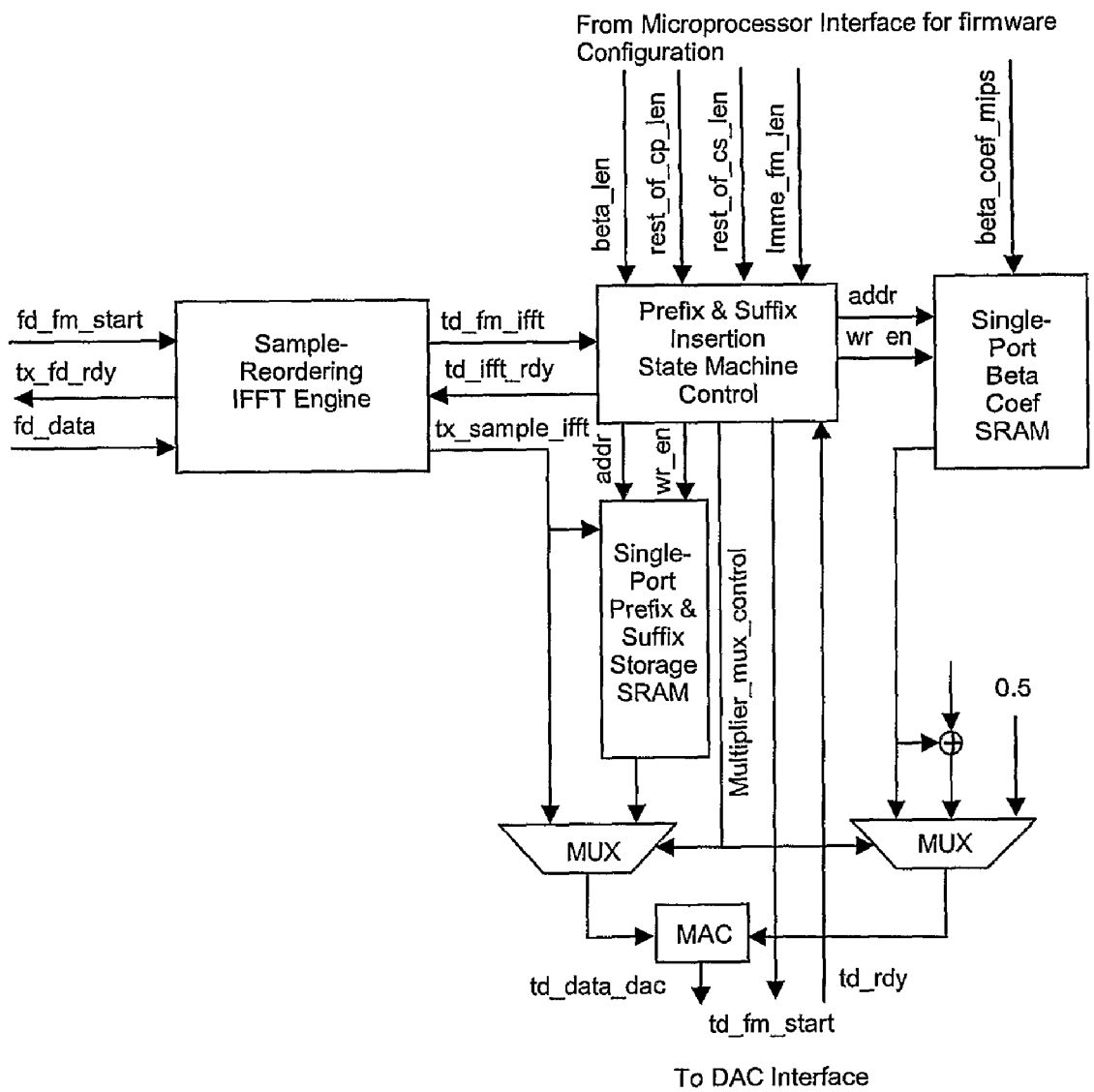
FIG. 9 shows transmitter hardware architecture based on sample reordering mechanism.
Figure 10:
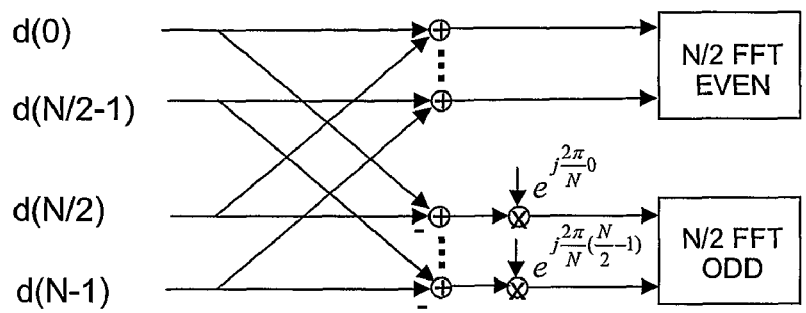
FIG. 10 shows FFT basic Radix-2 Butterfly operation.

FIG. 9 shows our transmitter hardware architecture based on our proposed novel sample reordering mechanism. The whole transmit chain is driven by a signal coming from the DAC interface called td_rdy. The DAC interface module will send the data to DAC for conversion while at the same time pull high td_rdy to inform prefix and suffix insertion module to generate next data. The prefix and suffix insertion state machine control will base on the current state and determine if it want to request a new data from the IFFT engine. If a new data is needed, it will pull tx_td_ifft high to request next new data while at the same time it registers tx_sample_ifft as the new data. We can see that td_rdy or td_ifft_rdy is only to push the upstream module to generate next new data while the current new data is always assumed available. Actually this "Pull only when needed" scheme is a very important part of our overall transmitter architecture. This enables us to reduce the memory use and consume less power.

If a new data is not needed, it will just pull the data out from the single-port prefix and suffix storage SRAM and at the same prepare the corresponding coefficient from the single-port coefficient RAM if the current processing is in the transmitter overlapping β area. If the current processing is not in the transmitter overlapping β factor, a factor of 0.5 will be used. A multiplier and accumulator (MAC) unit is used to summation two consecutive multiplications. The system clock of the prefix and suffix insertion block is running at 141.312 MHz while the maximum sampling frequency of DAC for highest VDSL2 profile 30 MHz is 70.656 MHz. Therefore, two system clock cycles are used to generate one transmit sample. If the factor 0.5 is used, the same transmit data either from IFFT engine or the single-port prefix and suffix storage RAM will be sent to MAC unit twice. So, it actually just passes the data through although the process is hooked into a pipe structure to be compatible with the case of the transmit overlapping β area. In the transmit overlapping β area, the transmit data from the sample-reorder IFFT engine tx_sample_ifft and the corresponding last frame data from the prefix and suffix SRAM are sent to MAC unit consecutive to multiply with the two coefficients β and 1−β.

For the prefix and suffix samples from the sample-reordering IFFT will be stored in the single-port prefix and suffix storage SRAM while sending to the MAC unit. It is due to the fact that the prefix and suffix samples are used twice in the extended transmit frame.

The signals fd_fm_start, td_fm_IFFT, td_fm_start are used to synchronize the frame boundary for each module. Basically the signal fd_fm_start will be used by the sample-reordering IFFT engine to synchronize the internal state. It will also propagate through the sample-reordering IFFT engine generate td_fm_IFFT for the prefix and suffix insertion module. Then the prefix and suffix insertion module will use td_fm_IFFT to synchronize its own internal state as well. Similarly td_fm_IFFT propagates through the prefix and suffix insertion module and generate td_fm_start for synchronization of the next module. This synchronization scheme is very important to maintain the frame boundary in our pipeline-based systems.

Firmware running on microprocessor controls the configuration parameters such as beta_len, rest_of_cp_len, rest_of cs_len, and immi_frame_len. Beta_len is basically the transmit overlapping area length β. Rest_of_cp is the cyclic prefix excluding the overlapping area and shall be equal to $L_{CP}$-β. Rest_of_Cs is the cyclic suffix excluding the overlapping area and shall be equal to $L_{CS}$-β. imme_frame_len is the length of the portion ❸ shown in previous figure, which will be immediately transmitted out without any addition buffering. It is equal to $2N_{SC}$-$L_{CP}$-$L_{CS}$. In addition, the coefficients for the overlapping area β are also programmable by the firmware to support different profiles.

Configurable Sample-Reordering IFFT Hardware Architecture

The first step to determine the hardware architecture is to decide the system clock frequency. Since 30 MHz profile requires a sampling frequency of 70.656 MHz, the throughput of the IFFT needs to be at least 70.656 MHz. Due to the fact single-port SRAM has almost half of the size of the dual-port SRAM, we will use only single-port SRAM in our design. Since the SDF based pipeline IFFT requires one write and one read operations for each pipeline advance, we choose 141.3120 MHz as the system clock for our IFFT hardware engine. This also enables us to use only two real multipliers for a complex multiplication of the twiddle factor at each stage by time multiplexing four real multiplications in two clock cycles with two real multipliers.

Figure 5:
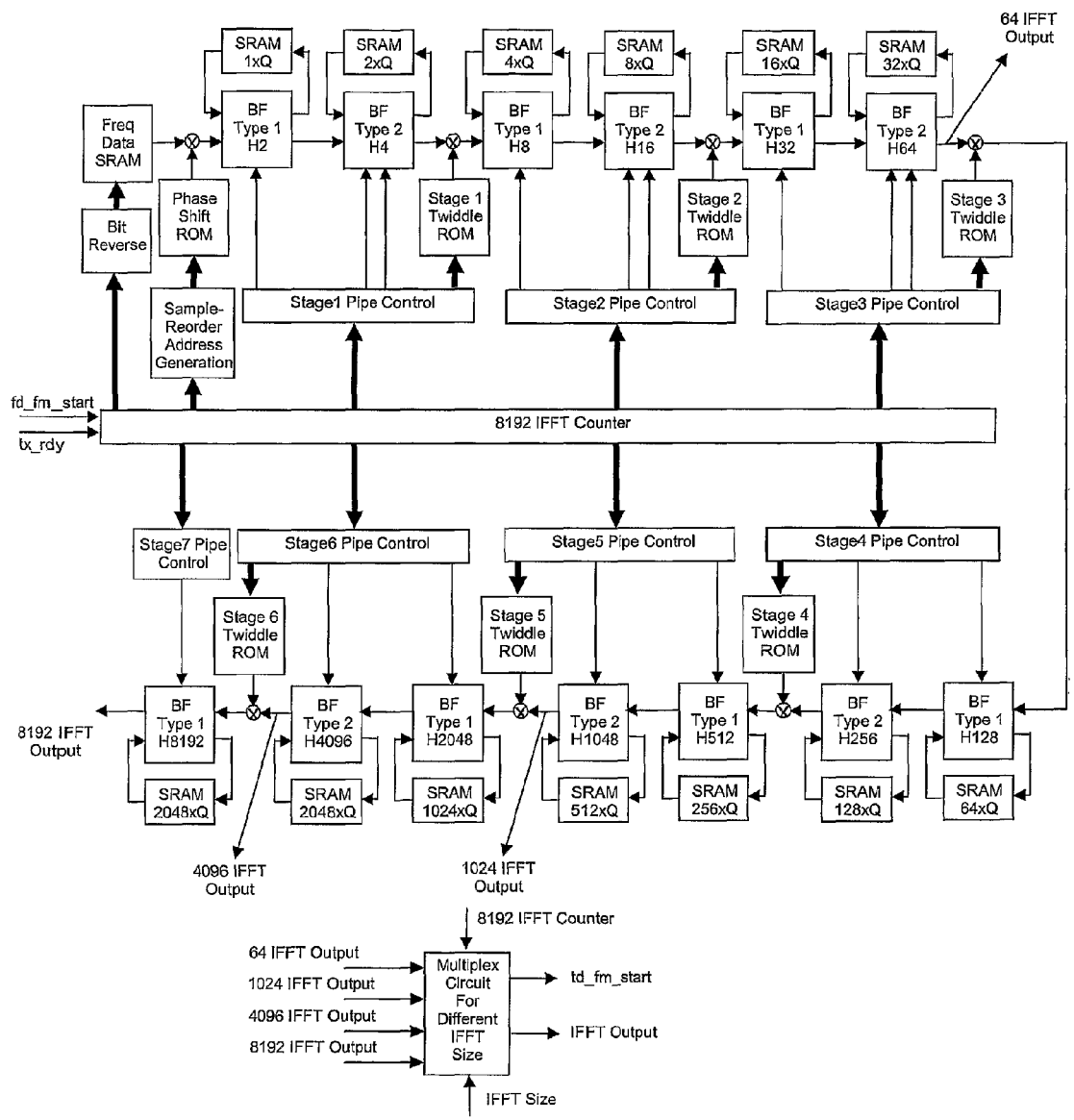
FIG. 5 shows top hardware architecture for sample-reordering IFFT based on phase shift mechanism.

FIG. 5 shows the sample-reordering IFFT hardware architecture with the first method. The pipeline control logic is primarily an 8 k counter, which corresponds to largest IFFT size we want to support. The fd_fm_start is a top-level signal used to synchronize the pipeline control especially the 8 k counter. With fd_fm_start, we can re-synchronize the pipeline after changing the IFFT size. There is a pipeline control generating circuit for each stage of IFFT, which is basically a combination logic used to subtract some fixed pipeline latency from previous stage from the 8192 IFFT counter. Bit reverse logic is used to reverse the order of the 8192 IFFT counter due to the fact our design is decimation-in-frequency based. The phase shift ROM stores the twiddle factor used for sample-reordering purpose as we discussed in Section 4 for the first method. For the first six stages, the complex data passes through type 1 and type 2 butterfly circuits discussed in Section 4 as well. The output complex vector of butterfly type 2 is multiplied with the twiddle factor ROM output and the address of the twiddle factor ROM is generated through the pipeline control circuit for that stage. As we mentioned before, we actually only need two real multipliers for each complex multiplication due to the factor of 2 of the system clock over the IFFT sampling frequency. Actually the output of every butterfly can be used in the multiplexer so that we can obtain different IFFT size of $2^i$. However, based on our assessment of VDSL2 requirement, we only take IFFT outputs from four places dictated so that we do not waste the gate count. The last stage is only a Radix-2 with butterfly type 1. Also, we noticed that the SRAM for the last stage is only 2048×Q (Q is the bit precision chosen for the intermediate complex data storage), instead of 4096. This is due to the fact that the output result of our IFFT shall only have real values. The td_fm_start signal is generated based on the pipeline control counter and the configured IFFT size and is used to synchronize the next module in our VDSL2 transmitter.

Figure 6:
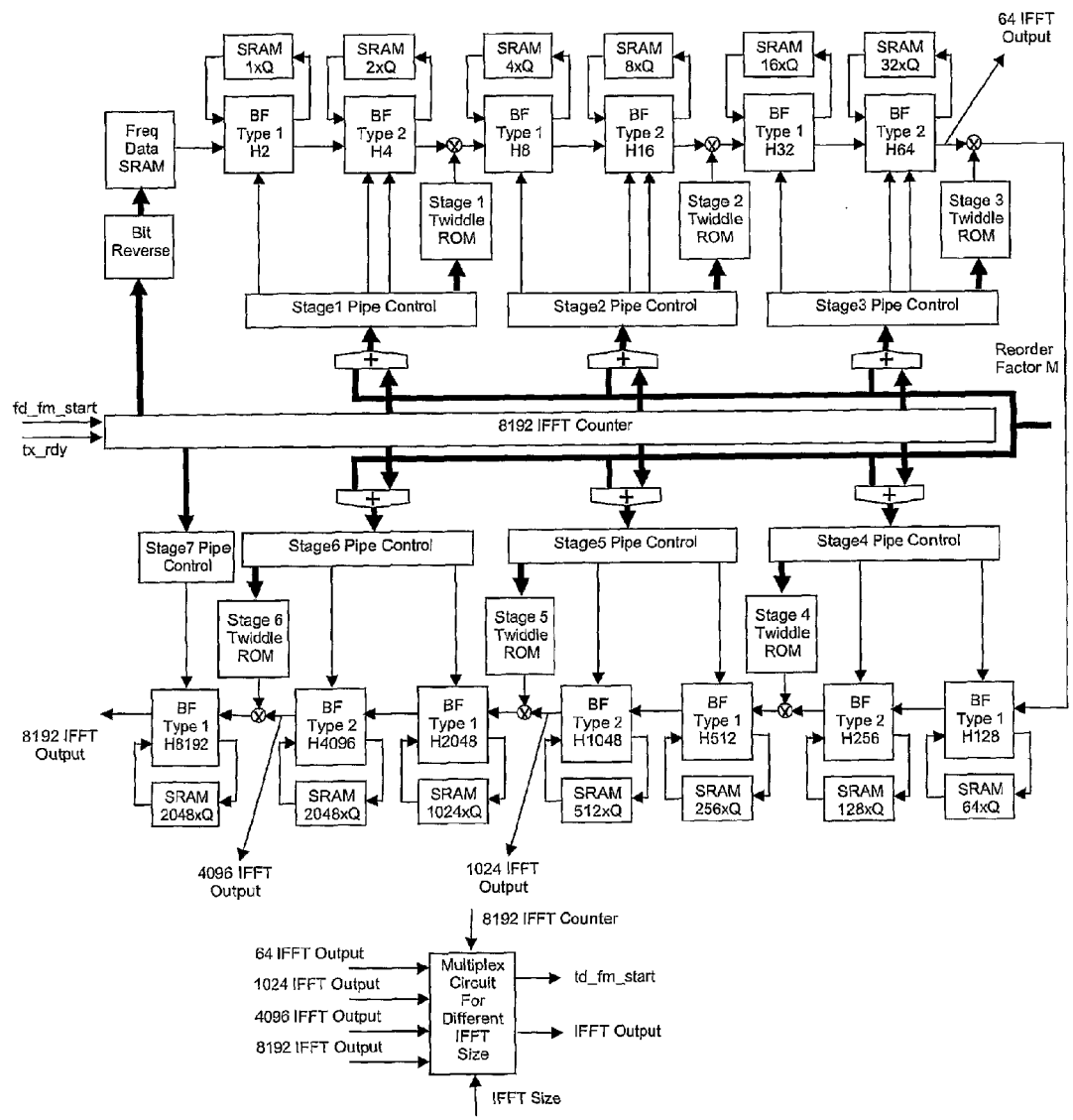
FIG. 6 shows top hardware architecture for sample-reordering IFFT based on pipeline modification scheme.

FIG. 5 shows the hardware architecture based on the first method in Section 4, which multiply the frequency domain data with a phase shift component. This method involves with additional hardware such as twiddle factor ROM and complex multipliers. FIG. 6 shows another method that does not require additional hardware at beginning. Instead it needs some modification on the pipeline control at each stage to accommodate the reordering factor M.

Mixed Radix-2 and Radix-$2^2$ Based FFT Design

Our unique design of IFFT converts the frequency-domain data to the time-domain data on the transmitter side while reducing die cost and power consumption. On the receiver side, we build our FFT engine to convert the time-domain data to the frequency-domain data on the receiver side to recover the coded information bits. Similarly our FFT design is also based on the mixed radix-2 and radix-$2^2$ algorithm. The direct FFT computation is $$f(k) = \sum_{n=0}^{N-1} d(n) e^{-j\frac{2\pi}{N}kn}.$$

Applying the radix-2 divide-and-conquer in time-domain, we have $$\begin{aligned}f(k) &= \sum_{n=0}^{\frac{N}{2}-1} d(n) e^{-j\frac{2\pi}{N}kn} + \sum_{n=\frac{N}{2}}^{N-1} d(n) e^{-j\frac{2\pi}{N}kn} \\ &= \sum_{n=0}^{\frac{N}{2}-1} d(n) e^{-j\frac{2\pi}{N}kn} + \sum_{n=0}^{\frac{N}{2}-1} d\left(n+\frac{N}{2}\right) e^{-j\frac{2\pi}{N}k(n+\frac{N}{2})} \\ &= \sum_{n=0}^{\frac{N}{2}-1} d(n) e^{-j\frac{2\pi}{N}kn} + (-1)^k \sum_{n=0}^{\frac{N}{2}-1} d\left(n+\frac{N}{2}\right) e^{-j\frac{2\pi}{N}kn} \\ &= \sum_{n=0}^{N_1-1} d(n) e^{-j\frac{2\pi}{N}kn} + (-1)^k \sum_{n=0}^{N_1-1} d(n+N_1) e^{-j\frac{2\pi}{N}kn}\end{aligned}$$

where $$N_1 = \frac{N}{2}.$$

Now we split f(k) into two parts: namely odd and even. We have $$\begin{aligned}f_{even}(2k_{N_1}) &= \sum_{n=0}^{N_1-1} e^{-j\frac{2\pi}{N_1}k_{N_1}n} [d(n) + d(n+N_1)] \\ &\triangleq \sum_{n=0}^{N_1-1} d_{N_1}(n) e^{-j\frac{2\pi}{N_1}k_{N_1}n} \\ f_{odd}(2k_{N_1}+1) &= \sum_{n=0}^{N_1-1} e^{-j\frac{2\pi}{N_1}k_{N_1}n} [d(n) - d(n+N_1)] \\ &\triangleq \sum_{n=0}^{N_1-1} d_{N_1+1}(n) e^{-j\frac{2\pi}{N_1}k_{N_1}n}\end{aligned}$$

where $$k_{N_1} = 0, 1, \ldots, \frac{N}{2}-1.$$

Figure 13:
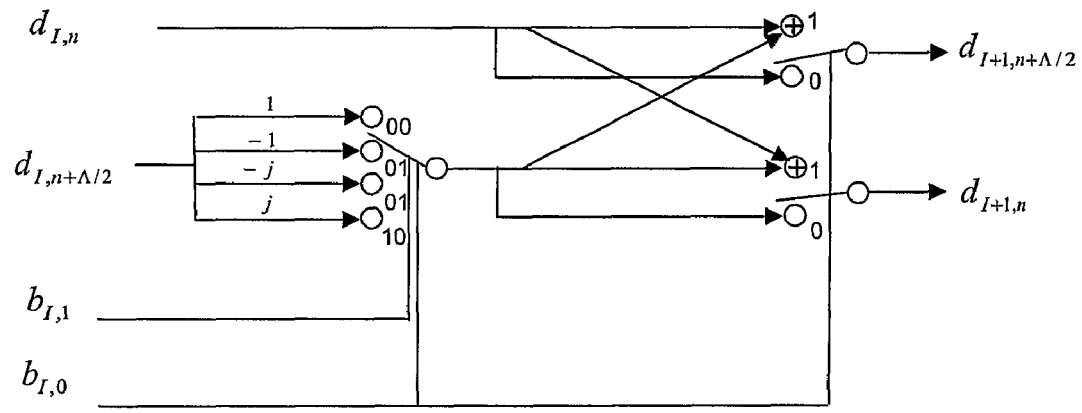
FIG. 13 shows FFT Butterfly Type 2.

This is basically a butterfly structure as shown in FIG. 13. Now we continue to split $f_{even}(2k_{N_1})$ with a radix-$2^2$ algorithm by substituting $$n = \frac{N_1}{4} n_1 + n_2,$$

where $n_1 = 0, 1, 2, 3$ and $$n_2 = 0, 1, \ldots, \frac{N_1}{4}.$$

We have $$f_{even}(2k_{N_1}) = \sum_{n_1=0}^{3} \sum_{n_2=0}^{\frac{N_1}{4}-1} d_{N_1}\left(\frac{N_1}{4}n_1 + n_2\right) e^{-j\frac{2\pi}{N_1} k_{N_1}\left(\frac{N_1}{4}n_1 + n_2\right)}$$

$$= \sum_{n_2=0}^{\frac{N_1}{4}-1} d_{N_1}(n_2) e^{-j\frac{2\pi}{N_1} k_{N_1} n_2} + \sum_{n_2=0}^{\frac{N_1}{4}-1} d_{N_1}\left(\frac{N_1}{2} + n_2\right)$$

$$e^{-j\frac{2\pi}{N_1} k_{N_1}\left(\frac{N_1}{2} + n_2\right)} + \sum_{n_2=0}^{\frac{N_1}{4}-1} d_{N_1}\left(\frac{N_1}{4} + n_2\right) e^{-j\frac{2\pi}{N_1} k_{N_1}\left(\frac{N_1}{4} + n_2\right)} +$$

$$\sum_{n_2=0}^{\frac{N_1}{4}-1} d_{N_1}\left(\frac{3N_1}{4} + n_2\right) e^{-j\frac{2\pi}{N_1} k_{N_1}\left(\frac{3N_1}{4} + n_2\right)}$$

$$= \sum_{n_2=0}^{\frac{N_1}{4}-1} \left[d_{N_1}(n_2) + (-1)^{k_{N_1}} d_{N_1}\left(\frac{N_1}{2} + n_2\right)\right] e^{-j\frac{2\pi}{N_1} k_{N_1} n_2} +$$

$$\sum_{n_2=0}^{\frac{N_1}{4}-1} \left[d_{N_1}\left(\frac{N_1}{4} + n_2\right) + (-1)^{k_{N_1}} d_{N_1}\left(\frac{3N_1}{4} + n_2\right)\right]$$

$$(-j)^{k_{N_1}} e^{-j\frac{2\pi}{N_1} k_{N_1} n_2}.$$

Similarly we split the frequency domain into four independent dimension of $k_{N_1} = k_1 + 2k_2 + 4k_3$, where $k_1 = 0, 1$, $k_2 = 0, 1$, and $$k_3 = 0, 1, \ldots, \frac{N}{4} - 1.$$

Then, we obtain $$f_{1/4}(4k_3) = \sum_{n_2=0}^{\frac{N_1}{4}-1} \left[d_{N_1}(n_2) + d_{N_1}\left(\frac{N_1}{2} + n_2\right) + d_{N_1}(n_2) + d_{N_1}\left(\frac{N_1}{2} + n_2\right)\right] e^{-j\frac{2\pi}{N_1/4} k_3 n_2}$$

$$f_{1/4}(4k_3 + 2) =$$

$$\sum_{n_2=0}^{\frac{N_1}{4}-1} \left\{\left[d_{N_1}(n_2) + d_{N_1}\left(\frac{N_1}{2} + n_2\right)\right] - \left[d_{N_1}(n_2) + d_{N_1}\left(\frac{N_1}{2} + n_2\right)\right]\right\} e^{-j\frac{2\pi}{N_1}(2n_2)} e^{-j\frac{2\pi}{N_1/4} k_3 n_2}$$

$$f_{1/4}(4k_3 + 1) =$$

$$\sum_{n_2=0}^{\frac{N_1}{4}-1} \left\{\left[d_{N_1}(n_2) - d_{N_1}\left(\frac{N_1}{2} + n_2\right)\right] - j\left[d_{N_1}(n_2) - d_{N_1}\left(\frac{N_1}{2} + n_2\right)\right]\right\} e^{-j\frac{2\pi}{N_1} n_2} e^{-j\frac{2\pi}{N_1/4} k_3 n_2}$$

$$f_{1/4}(4k_3 + 3) =$$

$$\sum_{n_2=0}^{\frac{N_1}{4}-1} \left\{\left[d_{N_1}(n_2) - d_{N_1}\left(\frac{N_1}{2} + n_2\right)\right] + j\left[d_{N_1}(n_2) - d_{N_1}\left(\frac{N_1}{2} + n_2\right)\right]\right\} e^{-j\frac{2\pi}{N_1}(3n_2)} e^{-j\frac{2\pi}{N_1/4} k_3 n_2}$$

Figure 11:
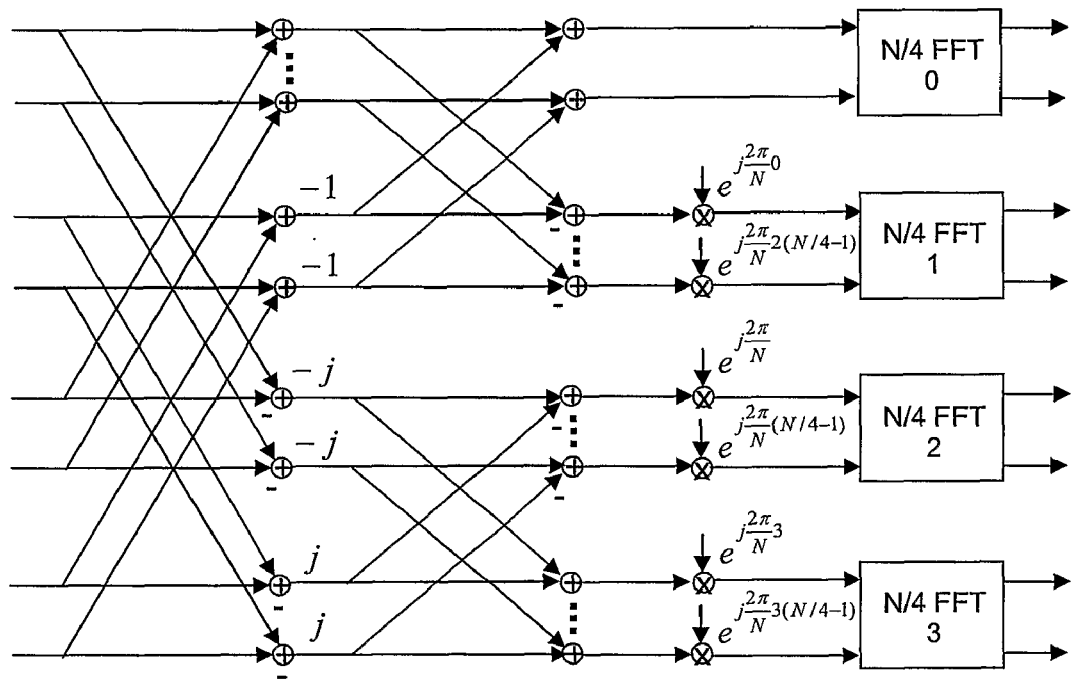
FIG. 11 shows FFT Radix-$2^2$ basic operation.

It is apparent to see two butterfly structures that are similar to the ones in IFFT. On the other hand, we can split $f_{even}$ in the similar way. The above splitting process can be continued until the size of FFT is less than 4. FIG. 11 shows the basic operation for radix-$2^2$ based FFT algorithm.

Figure 12:
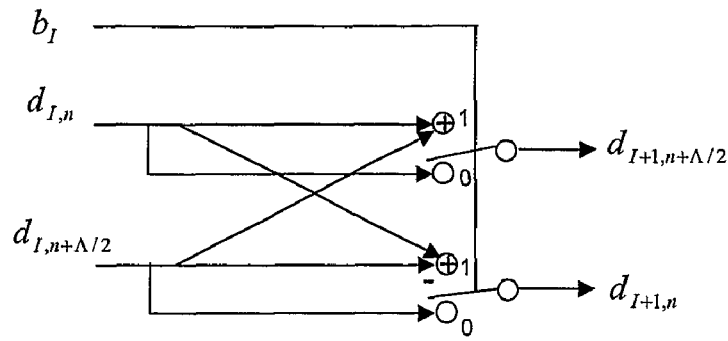
FIG. 12 shows FFT Butterfly Type 1.

Two types of butterfly structures for single-delay feedback architecture are shown in FIGS. 12 and 13.

Mixed Radix-2 and Radix-22 FFT Hardware Architecture

We choose the same system clock frequency 141.3120 MHz for our FFT engine as in the IFFT design based on the 30 MHz profile requirement and sole use of single-port SRAM.

Figure 14:
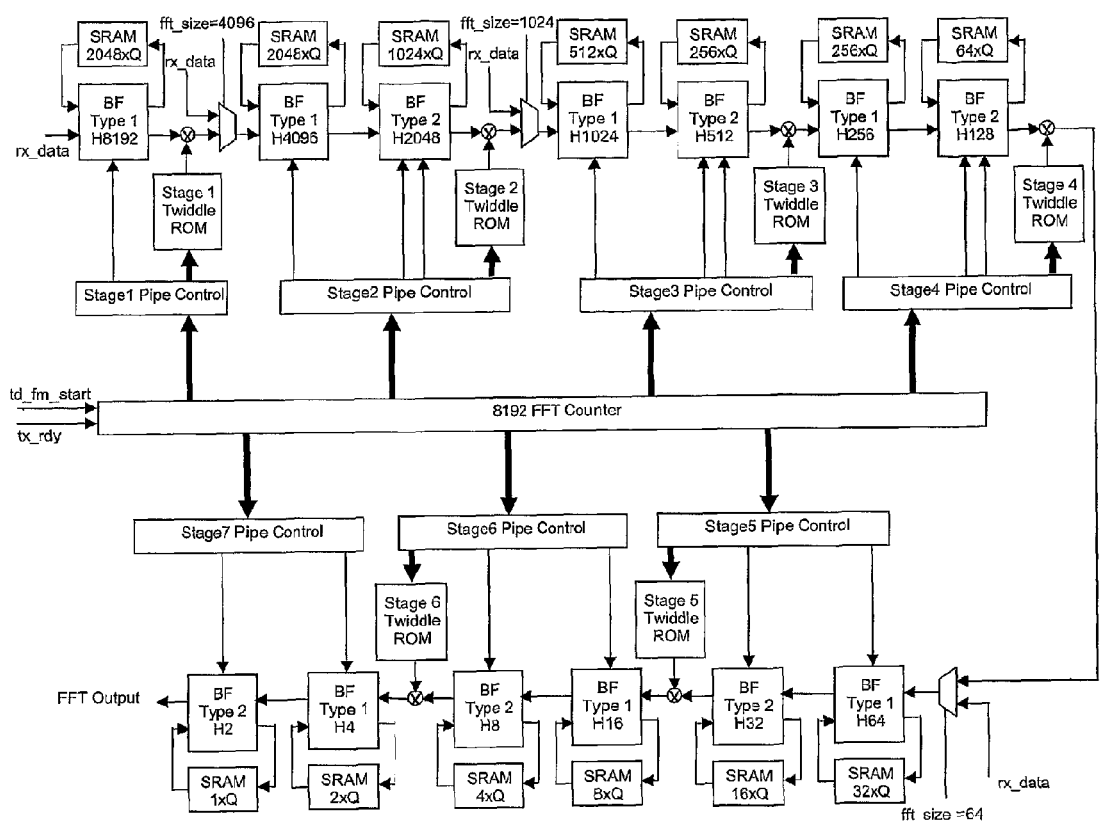
FIG. 14 shows FFT top-level hardware architecture.

Similarly this also enables us to use only two real multipliers for a complex multiplication of the twiddle factor at each stage by time multiplexing four real multiplications in two clock cycles with two real multipliers. Based on the discussion in previous Section, we have the top-level hardware architecture as shown in FIG. 14.

To support different FFT size, the receiver data is multiplexed into different entrance in the FFT engine. Our design is able to support any size of FFT. However, we only provide the support for FFT sizes of 8192, 4096, 1024, and 64 on the actual hardware to limit the hardware cost, which are related to the VDSL profile support.

Method and Apparatus to Reduce Receiver Memory Buffer Requirement

Figure 15:
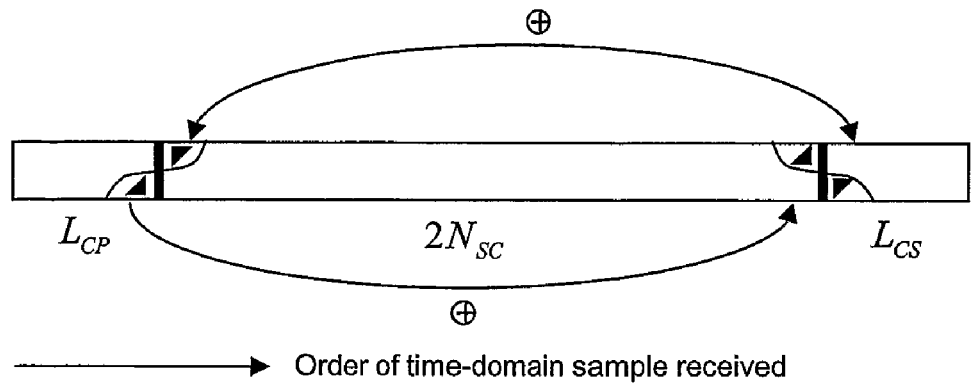
FIG. 15 shows basic operation of the receiver windowing.

On the receiver side, the extended frame will be processed by the corresponding prefix and suffix stripping module to eliminate the cyclic prefix and suffix. In order to improve the system performance for the narrow band interference and crosstalk, the receiver windowing is needed. The receiver windowing basically applies a time-domain window such as square-root raised cosine window on the received frame. FIG. 15 shows the operation of the receiver windowing.

In order to do the receiver windowing, the last portion of the cyclic prefix needs to be weight-averaged with the last part of the main $2N_{SC}$ FFT frame by the windowing coefficients, as shown in the figure by the symbol ◢. Similarly the first portion of the main $2N_{SC}$ FFT frame needs to be weight-averaged with the first part of the cyclic suffix, as shown in the figure by the symbol ◥.

Today's implementation scheme is to follow the strict definition of the receiver frame. It waits until all the receiver frame samples are received and then start processing the receiver windowing. However, this normal implementation will require buffering at least $2N_{SC}$ receiver frame samples, which means a buffer size of $2N_{SC} \times M$ at least. M is the bit precision for receiver samples. Then the windowed samples are sent to the FFT module for time-domain to frequency-domain conversion.

Figure 16:
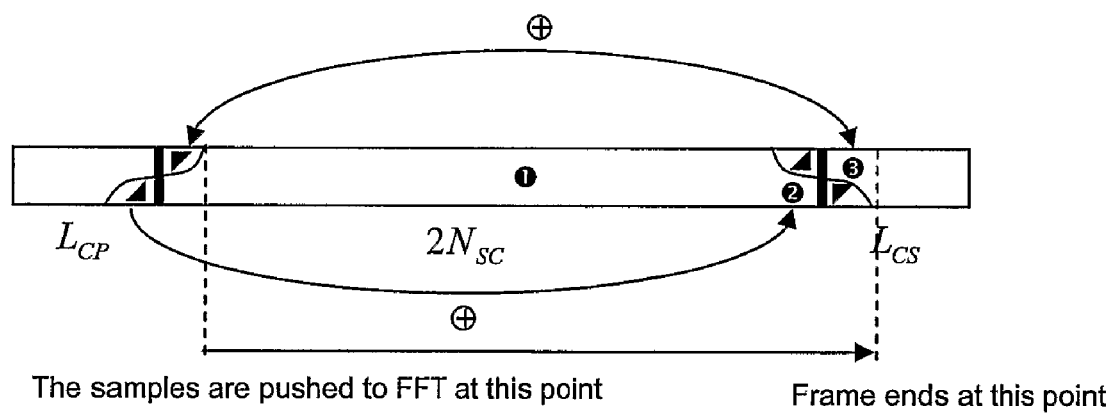
FIG. 16 shows new receiver windowing operation with our proposed method.

Here we propose to carry out the receiver windowing process with a completely innovative approach, which is shown FIG. 16.

When the frame starts to be received, we first discard the cyclic prefix until we reach the windowing portion. Then we start to save the windowing portion in the single-port SRAM. However, we start to send the received samples to the FFT engine right after the windowing portion instead of waiting for the whole frame to be received, which is shown in the above figure as the symbol ❶. Then the samples will be discarded without any buffering. Only when we reach the second windowing portion starting at the end of the $2N_{SC}$ samples, we start to doing the weight-average by pulling the stored first windowing portion out to combine with the second windowing portion, which are shown in the above figure as ❷ and ❸. With our proposed method, we only need to buffer the first windowing portion, which is basically trivial comparing with $2N_{SC} \times M$ buffer requirement.

Different from the normal approach, the proposed method artificially introduces a phase shift in the frequency domain since the sequence order has been changed by our proposed method. Assume the original sequence sent to the FFT engine is x(n), n=0, 1, ..., $2N_{SC}-1$, which has a frequency-domain transformation of $$f(k) = \sum_{n=0}^{2N_{SC}-1} x(n) e^{-j\frac{\pi}{N_{SC}}nk}.$$

With the new method, the sequence order becomes $x(\langle n+W\rangle_{2N_{SC}})$, n=0, 1, ..., $2N_{SC}-1$ and $\langle \rangle_{2N_{SC}}$ stands for modulo of $2N_{SC}$. The corresponding frequency-domain transformation becomes $$f'(k) = \sum_{n=0}^{2N_{SC}-1} x(n+W) e^{-j\frac{\pi}{N_{SC}}nk} = e^{-j\frac{\pi}{N_{SC}}Wk} f(k).$$

We can see that every frequency tone k is shifted by a proportional $$e^{-j\frac{\pi}{N_{SC}}Wk}.$$

This phase shift component may be compensated by the FFT hardware engine with two kinds of methods similar to the ones we used for the IFFT. However, if we further understand the overall system, we know that we actually do not need to compensate those phase shift at all in the hardware. Those phase shifts can be easily compensated by the existing hardware component called Frequency Equalizer (FEQ). The function of FEQ is to restore the communication channel that may already be equalized in time-domain by time-domain equalizer (TEQ) by applying a complex scalar $$\frac{1}{H(e^{j\pi k/N_{SC}})}.$$

With our method, one addition phase shift will be introduced and the new FEQ will be $$\frac{e^{j\frac{\pi}{N_{SC}}Wk}}{H(e^{j\pi k/N_{SC}})}.$$

Figure 17:
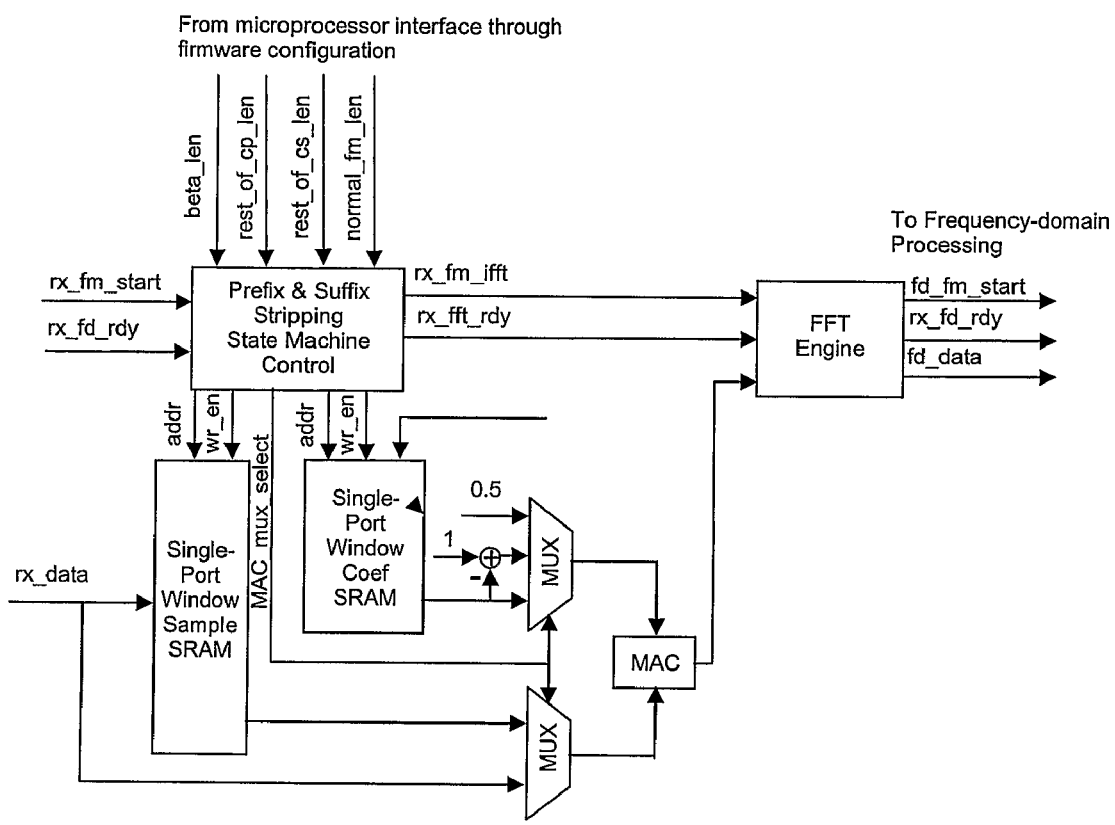
FIG. 17 shows top-level hardware architecture for our prefix and suffix stripping method.

We can see that this phase shift compensation can be easily added to the firmware FEQ coefficient computation. If hardware based FEQ LMS adaptation is used, this phase shift can be taken care of by the hardware itself and we do not even need a firmware modification. Therefore, our proposed method does not add additional die cost at all. Instead, it streamlines the receiver prefix and suffix stripping process and reduces die cost by almost completely eliminating the originally required large memory buffer. The hardware architecture for the prefix and suffix stripping module is shown in FIG. 17. The firmware will configure all the receiver windowing coefficients through the microprocessor interface, which is then stored in a small single-port SRAM. Other configuration parameters for the prefix and suffix stripping logics are also configured by the firmware. Those parameters include the length of receiver windowing beta_len, β, the number of prefix samples excluding receiver windowing, rest_of_cp_len, $L_{CP}$–β, the number of suffix samples excluding receiver windowing, rest_of_cs_len, $L_{CS}$–β, normal FFT frame length, norma_fm_len, $2N_{SC}$–2β. Those parameters provide information for the prefix and suffix stripping state machine controller to process the received frame based our proposed method.

The whole receiver path is streamlined with the ready signals to inform the next module to process the new coming data while frame-ready signals inform the boundary of the frame at each module so that certain synchronization can be carried out. Similarly to the transmit prefix and suffix insertion logic, the system clock of 141.312 MHz is twice of the effective sample clock 70.656 MHz, which enables us to use multiplier to run two multiplications and summation (MAC) during the receiver window processing. The first portion of the receiver windowing data will be stored in the single-port window sample SRAM and no data will be pushed to the FFT engine during this period. After the receiver window samples, the normal frame samples are pushed to the FFT engine with no buffering at all. After the normal frame samples, it comes the second receiver window samples. Then the first receiver window samples are taken out of the single-port window sample SRAM and combined with the incoming second receiver window samples through MAC and pipeline control. The weight-averaged samples are immediately sent to the FFT engine. Then the next frame comes and the above process repeats.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A VDSL2 transmitter architecture, comprising a IFFT engine for performing inverse fast Fourier transforms, the IFFT engine having:

a IFFT counter;

a frequency data SRAM;

a bit reverse logic used to reverse the order of the IFFT counter;

seven stages, each stage except for the last including type 1 butterfly circuit and type 2 butterfly circuit; the last stage only including the type 1 butterfly circuit; each stage having a stage pipeline control generating circuit, which is basically a combination logic used to subtract some fixed pipeline latency from previous stage from the IFFT counter;

wherein:
- a top-level signal (fd_fm_start) generated based on the pipeline control counter and the configured IFFT size, and used to synchronize the next module in the VDSL2 transmitter;
- for the first six stages, the complex data passes through type 1 and type 2 butterfly circuits; the output complex vector of butterfly type 2 is multiplied with the twiddle factor ROM output and the address of the twiddle factor ROM is generated through the pipeline control generating circuit for that stage;
- the IFFT output being taken from the output of butterfly type 2 of the stage 3, stage 5, stage 6, and stage 7 respectively.

2. The VDSL2 transmitter architecture of claim 1, wherein the IFFT counter is 8 k counter.

3. The VDSL2 transmitter architecture of claim 1, wherein the SRAM for the last stage is only 2048×Q, Q being the bit precision chosen for the intermediate complex data storage.

4. The VDSL2 transmitter architecture of claim 1, wherein the type 1 butterfly circuit based on Radix-2 algorithm, and the type 2 butterfly circuit based on Radix-$2^2$ algorithm.

5. The VDSL2 transmitter architecture of claim 4, wherein the type 1 butterfly circuit is configured to carry out:

$$e^{j\frac{2\pi}{N}n}\sum_{k=0}^{N_1-1} f_{odd}(k) e^{j\frac{2\pi}{N_1}kn}$$

where N is the IFFT size, f(k), k=0, 1, ..., N−1 is the frequency domain input, and $$e^{j\frac{2\pi}{N}kn}$$

is the so-called twiddle factor, $N_1=N/2$, $f_{even}(k)=f(2k)$, and $f_{odd}(k)=f(2k+1)$.

6. The VDSL2 transmitter architecture of claim 4, wherein the type 2 butterfly circuit is configured to carry out:

$$d_{N_1}(n) = \sum_{k_2}^{\frac{N_1}{4}-1} f_{even}(4k_2) e^{j\frac{2\pi}{N_1/4}k_2 n_3} + (-1)^{n_2} e^{j\frac{2\pi}{N_1}2n_3} \sum_{k_2}^{\frac{N_1}{4}-1} f_{even}(4k_2+2) e^{j\frac{2\pi}{N_1/4}k_2 n_3} +$$

$$(j)^{2n_1+n_2}\left\{ e^{j\frac{2\pi}{N_1}n_3}\sum_{k_2}^{\frac{N_1}{4}-1} f_{even}(4k_2+1) e^{j\frac{2\pi}{N_1/4}k_2 n_3} + (-1)^{n_2} e^{j\frac{2\pi}{N_1}3n_3}\sum_{k_2}^{\frac{N_1}{4}-1} f_{even}(4k_2+3) e^{j\frac{2\pi}{N_1/4}k_2 n_3} \right\}$$

where $$k = 4k_2 + k_1, k_1 = 0, 1, 2, 3, n = \frac{N_1}{2}n_1 + \frac{N_1}{4}n_2 + n_3,$$

$$n_1 = 0, 1, n_2 = 0, 1, \text{ and } n_3 = 0, 1, \ldots, \frac{N_1}{4} - 1.$$

7. The VDSL2 transmitter architecture of claim 4, the IFFT engine is a sample-reordering IFFT engine with the time-domain sample sequence re-organized.

8. The VDSL2 transmitter architecture of claim 7, wherein the IFFT engine generates the prefix part first and then the prefix part is transmitted immediately and buffered at the same time; then the suffix part is generated, which is also immediately transmitted and buffered; then the sample portion is generated by the IFFT engine and transmitted immediately.

9. The VDSL2 transmitter architecture of claim 8, to perform the time-domain sample sequence reorganization, the IFFT engine further comprising an additional complex multiplier, a phase shift ROM for storing the twiddle factor used for sample-reordering purpose, and a sample-reordering address generation module; wherein, the additional complex multiplication with twiddle factor ROM with configurable address related to different sample shift amount is done before sending the frequency-domain data to the normal IFFT pipeline.

10. The VDSL2 transmitter architecture of claim 8, the time-domain sample sequence reorganization is achieved by properly adjusting the twiddle factor ROM pointers at different stages within the pipeline process to make sure that there is no glitch between different shift value switching.

11. The VDSL2 transmitter architecture of claim 10, the transmitter architecture further comprising:
- a prefix and suffix insertion state machine control;
- a single-port prefix and suffix storage SRAM;
- a single-port coefficient RAM; and
- a multiplier and accumulator (MAC) unit used to summation two consecutive multiplications;

wherein:
- the whole transmit chain is driven by a signal (td_rdy) coming from the DAC interface; the DAC interface module sends the data to DAC for conversion while at the same time pulls high td_rdy to inform prefix and suffix insertion module to generate next data;
- the prefix and suffix insertion state machine control bases on the current state and determine if it want to request a new data from the IFFT engine;
- if a new data is needed, it will pull tx_td_ifft high to request next new data while at the same time it registers tx_sample_ifft as the new data;
- if a new data is not needed, it will just pull the data out from the single-port prefix and suffix storage SRAM and at the same prepare the corresponding coefficient from the single-port coefficient RAM if the current processing is in the transmitter overlapping β area; if the current processing is not in the transmitter overlapping β factor, a factor of 0.5 will be used.

12. The VDSL2 transmitter architecture of claim 11, in the transmit overlapping β area, the transmit data from the sample-reordering IFFT engine (tx_sample_ifft) and the corresponding last frame data from the prefix and suffix SRAM are sent to MAC unit consecutively to multiply with the two coefficients β and 1−β.

13. The VDSL2 transmitter architecture of claim 11, for the prefix and suffix samples from the sample-reordering IFFT will be stored in the single-port prefix and suffix storage SRAM while sending to the MAC unit.

14. The VDSL2 transmitter architecture of claim 11, the signals fd_fm_start, td_fm_IFFT, td_fm_start are used to synchronize the frame boundary for each module.

15. The VDSL2 transmitter architecture of claim 11, the system clock of the prefix and suffix insertion block is running at 141.312 MHz while the maximum sampling frequency of DAC for highest VDSL2 profile 30 MHz is 70.656 MHz.

16. The VDSL2 transmitter architecture of claim 11, if the factor 0.5 is used, the same transmit data either from IFFT engine or the single-port prefix and suffix storage RAM will be sent to MAC unit twice.

17. A VDSL2 receiver architecture, comprising a FFT engine for performing fast Fourier transforms, the FFT engine having:
- a FFT counter;
- seven stages, each stage except for the first including type 1 butterfly circuit and type 2 butterfly circuit; the first stage only including the type 1 butterfly circuit; each stage having a stage pipeline control generating circuit, which is basically a combination logic used to subtract some fixed pipeline latency from previous stage from the FFT counter;

wherein:
- a top-level signal (fd_fm_start) generated based on the pipeline control counter and the configured FFT size, and used to synchronize the next module in the VDSL2 receiver;
- for the last six stages, the complex data passes through type 1 and type 2 butterfly circuits; the output complex vector of butterfly type 2 is multiplied with the twiddle factor ROM output and the address of the twiddle factor ROM is generated through the pipeline control generating circuit for that stage;
- the FFT output being taken from the output of the stage 1, stage 2, stage 4, and stage 7 respectively.

18. The VDSL2 receiver architecture of claim 17, the system clock frequency for the said FFT engine is the same as that of the IFFT engine.

19. The VDSL2 receiver architecture of claim 18, wherein the type 1 butterfly circuit is configured to carry out:

$$f_{even}(2k_{N_1}) = \sum_{n=0}^{N_1-1} e^{-j\frac{2\pi}{N_1}k_{N_1}n}[d(n)+d(n+N_1)]$$

$$\triangleq \sum_{n=0}^{N_1-1} d_{N_1}(n) e^{-j\frac{2\pi}{N_1}k_{N_1}n}$$

$$f_{odd}(2k_{N_1}+1) = \sum_{n=0}^{N_1-1} e^{-j\frac{2\pi}{N_1}k_{N_1}n}[d(n)-d(n+N_1)]$$

$$\triangleq \sum_{n=0}^{N_1-1} d_{N_1+1}(n) e^{-j\frac{2\pi}{N_1}k_{N_1}n}$$

where $N_1 = \frac{N}{2}, k_{N_1} = 0, 1, \ldots, \frac{N}{2}-1$.

20. The VDSL2 receiver architecture of claim 18, wherein the type 2 butterfly circuit is configured to carry out:

$$f_{1/4}(4k_3) = \sum_{n_2=0}^{\frac{N_1}{4}-1} \left[d_{N_1}(n_2) + d_{N_1}\left(\frac{N_1}{2}+n_2\right) + d_{N_1}(n_2) + d_{N_1}\left(\frac{N_1}{2}+n_2\right)\right] e^{-j\frac{2\pi}{N_1/4}k_3 n_2}$$

$$f_{1/4}(4k_3+2) =$$

$$\sum_{n_2=0}^{\frac{N_1}{4}-1} \left\{\left[d_{N_1}(n_2) + d_{N_1}\left(\frac{N_1}{2}+n_2\right)\right] - \left[d_{N_1}(n_2) + d_{N_1}\left(\frac{N_1}{2}+n_2\right)\right]\right\} e^{-j\frac{2\pi}{N_1}(2n_2)} e^{-j\frac{2\pi}{N_1/4}k_3 n_2}$$

$$f_{1/4}(4k_3+1) =$$

$$\sum_{n_2=0}^{\frac{N_1}{4}-1} \left\{\left[d_{N_1}(n_2) - d_{N_1}\left(\frac{N_1}{2}+n_2\right)\right] - j\left[d_{N_1}(n_2) - d_{N_1}\left(\frac{N_1}{2}+n_2\right)\right]\right\} e^{-j\frac{2\pi}{N_1}n_2} e^{-j\frac{2\pi}{N_1/4}k_3 n_2}$$

$$f_{1/4}(4k_3+3) =$$

$$\sum_{n_2=0}^{\frac{N_1}{4}-1} \left\{\left[d_{N_1}(n_2) - d_{N_1}\left(\frac{N_1}{2}+n_2\right)\right] + j\left[d_{N_1}(n_2) - d_{N_1}\left(\frac{N_1}{2}+n_2\right)\right]\right\} e^{-j\frac{2\pi}{N_1}(3n_2)} e^{-j\frac{2\pi}{N_1/4}k_3 n_2}$$

where $$n = \frac{N_1}{4}n_1 + n_2, n_1 = 0, 1, 2, 3$$

and $$n_2 = 0, 1, \ldots, \frac{N_1}{4}, k_{N_1} = k_1 + 2k_2 + 4k_3, k_1 = 0, 1,$$

$$k_2 = 0, 1, \text{ and } k_3 = 0, 1, \ldots, \frac{N}{4}-1.$$

21. The VDSL2 receiver architecture of claim 20, further comprising a prefix and suffix stripping module to eliminate the cyclic prefix and suffix.

22. The VDSL2 receiver architecture of claim 20, wherein the prefix and suffix stripping module includes:
- a prefix and suffix stripping state machine control;
- a single-port window sample SRAM;
- a single-port window coefficient SRAM; and
- a MAC;

wherein:
- the whole receiver path is streamlined with the ready signals to inform the next module to process the new coming data while frame-ready signals inform the boundary of the frame at each module so that certain synchronization can be carried out;
- the first portion of the receiver windowing data will be stored in the single-port window sample SRAM and no data will be pushed to the FFT engine during this period;
- after the receiver window samples, the normal frame samples are pushed to the FFT engine with no buffering at all;
- after the normal frame samples, it comes the second receiver window samples;
- then the first receiver window samples are taken out of the single-port window sample SRAM and combined with the incoming second receiver window samples through MAC and pipeline control;
- the weight-averaged samples are immediately sent to the FFT engine; then the next frame comes and the above process repeats.

23. The VDSL2 receiver architecture of claim 22, wherein the receiver windowing process comprising the following steps:
- when the frame starts to be received, first discard the cyclic prefix until reaching the windowing portion;
- then start to save the windowing portion in the single-port SRAM; the received samples are sent to the FFT engine right after the windowing portion instead of waiting for the whole frame to be received;
- then the samples will be discarded without any buffering; only when reach the second windowing portion starting at the end of the $2N_{SC}$ samples, the weight-average is started by pulling the stored first windowing portion out to combine with the second windowing portion.

24. The VDSL2 receiver architecture of claim 23, the system clock is 141.312 MHz and is twice of the effective sample clock 70.656 MHz, so as to enable to use multiplier to run two multiplications and summation (MAC) during the receiver window processing.

25. The VDSL2 receiver architecture of claim 23, the phase shifts in the frequency domain can be easily compensated by the existing Frequency Equalizer (FEQ) by making the FEQ as $$\frac{e^{j\frac{\pi}{N_{SC}}Wk}}{H(e^{j\pi k/N_{SC}})}.$$

26. The VDSL2 receiver architecture of claim 24, all the receiver windowing coefficients being configured by the firmware through the microprocessor interface, which are then stored in a small single-port SRAM.

27. The VDSL2 receiver architecture of claim 24, other configuration parameters for the prefix and suffix stripping logics are also configured by the firmware.

28. The VDSL2 receiver architecture of claim 17, the FFT counter is 8 k FFT counter.

* * * * *